US011273740B2

(12) United States Patent
Fujita et al.

(10) Patent No.: US 11,273,740 B2
(45) Date of Patent: Mar. 15, 2022

(54) VEHICLE SEAT VENTILATION MECHANISM AND VEHICLE SEAT

(71) Applicant: DELTA KOGYO CO., LTD., Aki-gun (JP)

(72) Inventors: Etsunori Fujita, Higashihiroshima (JP); Yumi Ogura, Higashihiroshima (JP); Tatsuya Motoie, Aki-gun (JP); Atsushi Nishida, Aki-gun (JP); Naoki Tsukamoto, Aki-gun (JP); Yoshika Nobuhiro, Aki-gun (JP); Shogo Inoue, Aki-gun (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 16/970,189

(22) PCT Filed: Jan. 25, 2019

(86) PCT No.: PCT/JP2019/002592
§ 371 (c)(1),
(2) Date: Aug. 14, 2020

(87) PCT Pub. No.: WO2019/159656
PCT Pub. Date: Aug. 22, 2019

(65) Prior Publication Data
US 2021/0078471 A1  Mar. 18, 2021

(30) Foreign Application Priority Data

Feb. 17, 2018 (JP) .............................. JP2018-026549
Sep. 28, 2018 (JP) .............................. JP2018-186175

(51) Int. Cl.
*B60N 2/60* (2006.01)
*B60N 2/72* (2006.01)
(Continued)

(52) U.S. Cl.
CPC ......... *B60N 2/5642* (2013.01); *B60N 2/5657* (2013.01); *B60N 2/58* (2013.01)

(58) Field of Classification Search
CPC ............................ B60N 2/5642; B60N 2/5657
See application file for complete search history.

(56) References Cited

U.S. PATENT DOCUMENTS 6,019,420 A    2/2000  Faust et al.
6,119,463 A *  9/2000  Bell .................... B60H 1/00471
                                              62/3.7
(Continued)

FOREIGN PATENT DOCUMENTS

JP    11-285422 A    10/1999
JP    2004-17855 A    1/2004
(Continued)

OTHER PUBLICATIONS

International Search Report dated Apr. 2, 2019, in PCT/JP2019/002592 filed Jan. 25, 2019, 2 pages.

*Primary Examiner* — Shin H Kim
(74) *Attorney, Agent, or Firm* — Oblon, McClelland, Maier & Neustadt, L.L.P.

(57) ABSTRACT

By promoting air circulation, heat and humidity are reduced more efficiently. A vehicle seat ventilation mechanism includes: a body case which is provided in a cushioning material of at least one of a seat cushion and a seat back and whose interior is an air circulation space; a fan disposed in the body case; and an exhaust port which is provided at a position apart from the fan and discharges an air stream created by air suction by the fan. The air stream enhances the comfort of a microclimate condition on a vehicle seat side which is a rear side of a contact surface, and with this microclimate condition, a thermal environment on a seat occupant side having an increased causal factor of discom- (Continued)

fort is replaced, thereby making it possible to enhance the comfort of the clothing microclimate.

15 Claims, 21 Drawing Sheets

(51) Int. Cl.
*B60N 2/56* (2006.01)
*B60N 2/58* (2006.01)

(56) References Cited

U.S. PATENT DOCUMENTS

| | | | | |
|---|---|---|---|---|
| 6,291,803 B1 * | 9/2001 | Fourrey | ................ | B60N 2/58 |
| | | | | 219/202 |
| 6,817,675 B2 * | 11/2004 | Buss | ................ | B60N 2/5635 |
| | | | | 297/180.11 |
| 6,957,545 B2 * | 10/2005 | Aoki | ................ | B60H 1/00064 |
| | | | | 454/120 |
| 7,201,441 B2 * | 4/2007 | Stoewe | ................ | B60N 2/5635 |
| | | | | 297/180.1 |
| 7,475,938 B2 * | 1/2009 | Stoewe | ................ | B60N 2/5635 |
| | | | | 297/180.1 |
| 9,036,348 B2 * | 5/2015 | Huang | ................ | G06F 1/20 |
| | | | | 361/695 |
| 9,096,157 B2 * | 8/2015 | Line | ................ | B60N 2/6009 |
| 10,471,865 B2 * | 11/2019 | Kato | ................ | B60N 2/5657 |
| 10,625,643 B2 * | 4/2020 | Iacovone | ................ | B60N 2/5875 |
| 10,710,480 B2 * | 7/2020 | Iacovone | ................ | B60N 2/5883 |
| 2002/0092308 A1 * | 7/2002 | Bell | ................ | B60N 2/5678 |
| | | | | 62/3.7 |
| 2002/0150478 A1 * | 10/2002 | Aoki | ................ | F04D 17/10 |
| | | | | 417/44.1 |
| 2004/0139758 A1 * | 7/2004 | Kamiya | ................ | B60N 2/5635 |
| | | | | 62/244 |
| 2004/0201481 A1 | 10/2004 | Yoshinori et al. | | |
| 2007/0176471 A1 * | 8/2007 | Knoll | ................ | B60N 2/5685 |
| | | | | 297/180.14 |
| 2011/0061400 A1 * | 3/2011 | Park | ................ | B60N 2/5657 |
| | | | | 62/3.2 |
| 2014/0203599 A1 * | 7/2014 | Line | ................ | B60N 2/5642 |
| | | | | 297/180.14 |
| 2015/0251578 A1 | 9/2015 | Ishii et al. | | |
| 2018/0079278 A1 * | 3/2018 | Kirpichnikov | ..... | B60H 1/00821 |
| 2021/0078471 A1 * | 3/2021 | Fujita | ................ | B60N 2/58 |

FOREIGN PATENT DOCUMENTS

| | | |
|---|---|---|
| JP | 2004-284450 A | 10/2004 |
| JP | 2013-147225 A | 8/2013 |
| JP | 2014-58238 A | 4/2014 |
| JP | 2017-19335 A | 1/2017 |
| JP | 2018-262 A | 1/2018 |

* cited by examiner (a)

CHANGE IN SURFACE TEMPERATURE

FAN OPERATED

0 SECOND | 30 SECONDS | 60 SECONDS | 90 SECONDS | 120 SECONDS | 150 SECONDS | 180 SECONDS
210 SECONDS | 240 SECONDS | 270 SECONDS | 300 SECONDS | 330 SECONDS | 360 SECONDS | 390 SECONDS
420 SECONDS | 450 SECONDS | 480 SECONDS | 510 SECONDS | 540 SECONDS | 570 SECONDS | 600 SECONDS

VEHICLE SEAT VENTILATION MECHANISM AND VEHICLE SEAT

TECHNICAL FIELD

The present invention relates to a ventilation mechanism for vehicle seats used in automobiles, airplanes, trains, and so on and to a vehicle seat.

BACKGROUND ART

Patent Document 1 discloses a vehicle air conditioner including fans which are assembled in a seat back and ventilation passages which communicate with the fans and are built in cushioning materials of the seat cushion and the seat back. The fans are assembled in the cushioning material of the seat back, and ducts communicating with the fans are disposed with their suction ports being opened in surfaces of the cushioning materials of the seat cushion and the seat back. When the fans are operated, air is sucked into the ducts from the surfaces of the cushioning materials, and the sucked air is discharged to the outside of the seat. This is intended to promote ventilation near a contact portion between a person and the seat to improve the comfort while the person is seated. Further, having the same object, Patent Document 2 discloses a blowing device for vehicular seat which includes first air blowing paths having through holes opened in a surface of a seat cushion and second air blowing paths communicating with the first air blowing paths, and in which air is sucked by a blower from the surface of the seat cushion through the through holes and is discharged to the outside of the seat through the first air blowing paths and the second air blowing paths.

PRIOR ART DOCUMENT

Patent Document

Patent Document 1: Japanese Patent Application Laid-open No. 2014-58238
Patent Document 2: Japanese Patent Application Laid-open No. 2017-19335

DISCLOSURE OF THE INVENTION

Problems to be Solved by the Invention

Those disclosed in Patent Documents 1 and 2 are both intended to reduce heat and reduce humidity ascribable to sweat and so on, mainly near the contact portion between the person and the seat surface by sucking the indoor air, and their adjustment region is limited only to the vicinity of the suction ports and thus is local. Further, in both of these, a feeling of something foreign caused by the fans depends on the thickness of the cushioning material covering the fans, and providing a mechanism for air circulation (ventilation mechanism) in the seat increases the thickness of the whole cushioning material and also increases its weight. Further, in those disclosed in Patent Documents 1 and 2, the openings serving as the suction ports need to be made in the surface of the cushioning material, but to suck the air from a wide range of the surface of the seat cushion or the surface of the seat back, the air passages provided in a pad material has to range wide, and in addition, its route is complicated so that the suction ports can be made at intended positions. This complicates the structure of the pad material forming the cushioning material to increase production cost.

It is known that heat exchange caused by temperature differences between the environment and clothing and between the clothing and a seat occupant and energy exchange governed by a vapor concentration difference therebetween form a clothing microclimate. It is said that a person feels a clothing microclimate comfortable when the temperature in the clothing is within a range of $32\pm1°$ C., the humidity in the clothing is within a range of $50\pm1°$ % RH, and an air flow rate is within a range of $25\pm15$ cm/sec. There is a demand for a function to keep the clothing microclimate within the comfortable range by moving or shutting off moisture and heat according to an environmental condition of the outside air and a person's activity state.

It is also known that a body temperature regulation function is deeply involved in thermal comfort. There is a limit in the body temperature regulation, and there are a lower-temperature side limit and a high-temperature side limit. A range between these limits is a tolerance range, and this range includes a range where the body temperature can be made constant without the body temperature regulation function working, and this range is called an optimal range. It is also known that the optimal range based on the body temperature regulation is substantially the same as a comfortable temperature. The homeostasis of the body temperature is maintained by a balance between the heat production amount and the heat release amount. Heat release is proportional to a difference between skin temperature and air temperature and the skin temperature drops when the air temperature lowers. The drop in the skin temperature contracts peripheral blood vessels of the skin to reduce a cutaneous blood flow. On the other hand, an increase in the air temperature expands the peripheral blood vessels to increase the cutaneous blood flow, resulting in an increase in the skin temperature. The blood vessel regulation range of varying the cutaneous blood flow by the contraction and expansion of the cutaneous blood vessels to vary the skin temperature is a reaction not accompanied by energy consumption and makes the body temperature constant. A physiologically optimal temperature range is 29 to 31° C., and average skin temperature at this time is 33 to 34.5° C., which is a state not hot nor cold.

What affect thermal comfort include clothing, metabolic rate, air temperature, radiation temperature, air current, and humidity. However, clothing and metabolic rate are different depending on each person. Air temperature, radiation temperature, air current, and humidity are diverse, and people live in a variety of lifestyle habits. Therefore, it is difficult to narrow down thermal environments comfortable for a person to one condition, and it is necessary to individually optimize clothing connecting the environment and a person, that is, clothing microclimate.

The present invention was made in consideration of the above and has an object to provide a vehicle seat ventilation mechanism that can more efficiently reduce heat and humidity by promoting air circulation and, with a simple configuration, can avoid the complication of the structure of a cushioning material and further can more reduce an increase in thickness and weight of the entire cushioning material than conventionally even if the ventilation mechanism is assembled in a vehicle seat, and to provide a vehicle seat. Another object of the present invention is to provide a vehicle seat ventilation mechanism capable of more appropriately controlling a clothing microclimate for each individual, and to provide a vehicle seat.

Means for Solving the Problem

To solve the above problems, a vehicle seat ventilation mechanism of the present invention is a vehicle seat ventilation mechanism including:

a body case which is provided in at least one of a seat cushion and a seat back of the vehicle seat on a rear surface side of a contact surface with a seat occupant and whose interior is an air circulation space;

an intake port and an exhaust port formed in the body case; and a fan which is disposed in the body case and sucks air from the intake port and causes the air to flow out from the exhaust port, thereby generating an air stream on the vehicle seat side which is the rear surface side of the contact surface, wherein a microclimate condition formed on the vehicle seat side by the air stream acts on the seat occupant side beyond the contact surface.

Preferably, the vehicle seat ventilation mechanism further includes a swirling stream generation part which swirls the air stream in the body case to cause the air stream to be discharged as a swirling stream from the exhaust port.

Preferably, the swirling stream generation part has a cylindrical portion rising in a direction toward the exhaust port and generates the swirling stream by making the air stream swirl around the cylindrical portion.

Preferably, the body case has a bottom wall portion and an upper wall portion which face each other at a predetermined interval and a peripheral wall portion surrounding peripheral edges of the bottom wall portion and the upper wall portion, and the intake port is provided in the upper wall portion at a position corresponding to the fan.

Preferably, in the body case, a distance from the intake port to the bottom wall portion is set so as to enable part of the stream of the air sucked by the fan to be reflected by the bottom wall portion and discharged from the intake port.

Preferably, in a case where the ventilation mechanism is provided in the seat cushion, a rotation center of the fan is located clear of a range with a predetermined body pressure distribution or higher including a position corresponding to an ischial tuberosity of the seat occupant and is located in a range more rearward or forward than the range including the position corresponding to the ischial tuberosity.

Preferably, in a case where the ventilation mechanism is provided in the seat back, a rotation center of the fan is located clear of a range with a predetermined body pressure distribution or higher including a position corresponding to an upper part of a pelvis of the seat occupant and is located in a range below or above the range including the position corresponding to the upper part of the pelvis.

Preferably, driving of the fan is controlled based on a biological state which is found through an analysis of a biosignal obtained from the seat occupant.

A vehicle seat of the present invention includes the above-described vehicle seat ventilation mechanism, the ventilation mechanism being provided in at least one of a seat cushion and a seat back.

Preferably, a cushioning material forming the at least one of the seat cushion and the seat back includes a pad material and a cover member covering a surface of the pad material, and the vehicle seat ventilation mechanism is disposed in a concave portion formed in the pad material.

Preferably, an elastic member is provided on a bottom portion of the concave portion, and the vehicle seat ventilation mechanism is supported by the elastic member.

Preferably, the cover member is at least partly formed of a three-dimensional knitted fabric.

Preferably, in the seat cushion, a rotation center of the fan of the ventilation mechanism is located clear of a range with a predetermined body pressure distribution or higher including a position corresponding to an ischial tuberosity of a seat occupant and is located in a range more rearward or more forward than the range including the position corresponding to the ischial tuberosity.

Preferably, in the seat back, a rotation center of the fan of the ventilation mechanism is located clear of a range with a predetermined body pressure distribution or higher including a position corresponding to an upper part of a pelvis of a seat occupant and is located in a range below or above the range including the position corresponding to the upper part of the pelvis.

Preferably, a biosignal measurement device which obtains a biosignal from the seat occupant is provided in the seat back, and driving of the fan of the ventilation mechanism is controlled based on a biological state which is found through an analysis of the biosignal.

Preferably, the ventilation mechanism has a drive control unit which controls the fan to vary an air flow rate level of the air stream based on the biological state.

Effects of the Invention

The vehicle seat ventilation mechanism of the present invention forms the air stream on the vehicle seat side beyond the contact surface, and the air stream forms a predetermined microclimate condition on the vehicle seat side. The generation of the air stream promotes a temperature decrease and a humidity decrease, creating a highly comfortable microclimate condition. Therefore, if a causal factor of the discomfort of the clothing microclimate of the seat occupant increases, for example, if temperature or humidity increases, the highly comfortable microclimate condition formed by the air stream on the vehicle seat side, for example, low-temperature and drier heat moves to the seat occupant side through the contact surface (outer layer member), making it possible to improve the comfort of the clothing microclimate of the seat occupant. Further, the structure in which the air is discharged as the swirling stream forms a turbulent flow on the vehicle seat side, making it possible to promote a temperature decrease and a humidity decrease. Further, if a hole is formed in the contact surface (outer layer member), a flow mainly in a tangent direction more easily occurs than in a normal direction to the body surface such as the scruff of the neck or the thighs, and an air layer near the body surface can be efficiently stirred, making it possible to increase an effect of reducing heat, humidity, and so on to improve the comfort.

Further, depending on the arrangement position and direction of the ventilation mechanism, the air stream formed on the vehicle seat side can form, on the vehicle seat side, a thermal environment that is warmer than that on the seat occupant side owing to the heat or the like of a motor of the ventilation mechanism. Therefore, if the temperature of the interior of the vehicle is low, it is possible to use the ventilation mechanism of the present invention also as a heater.

Further, to enhance ventilation efficiency, it is not necessary to provide exhaust ports and air passages in a wide range of the seat cushion and the seat back as is done in a conventional device which only performs the intake, making it possible to downsize the entire device. Specifically, it is only necessary to hollow out a predetermined range of the cushioning material and place the ventilation mechanism in this range, and it is possible to easily support the whole ventilation mechanism by the elastic member such as rubber. This makes it possible to ensure a predetermined cushioning property in the range where the ventilation mechanism is disposed without increasing the thickness of the cover member covering the ventilation mechanism, which can contribute also to a reduction in a feeling of something foreign.

Further, as the cover member covering the ventilation mechanism, one at least partly including the three-dimensional knitted fabric is preferably used. Since the air stream passes through meshes of the three-dimensional knitted fabric, a replacement operation of the microclimate condition of the seat occupant side with that of the vehicle seat side across the contact surface (cover member) is easily promoted. In addition, since the three-dimensional knitted fabric can exhibit a high cushioning property even if it is thin owing to the rigidity and elasticity of its ground knitted fabrics and connecting yarns, it can reduce the feeling of something foreign of the ventilation mechanism without being made very thick. The use of the three-dimensional knitted fabric, as a result, eliminates a need for providing a thick cushioning material and thus can inhibit an increase in weight of the vehicle seat even if the ventilation mechanism is provided.

In the case where the ventilation mechanism is provided in the seat cushion, preferably, the rotation center of the fan is located clear of the range with the predetermined body pressure distribution or higher including the position corresponding to the ischial tuberosity of the seat occupant and is located in the range more rearward or forward than the aforesaid range. The body pressure distribution near the ischial tuberosity is high, and therefore, locating the fan clear of this range more reduces the feeling of something foreign. Further, in the case where the ventilation mechanism is provided in the seat back, preferably, the rotation center is located clear of the range with the predetermined body pressure distribution or higher including the position corresponding to the upper part of the pelvis of the seat occupant and is located below or above the aforesaid range. The body pressure distribution near the position corresponding to the upper part of the pelvis is also high, and therefore, locating the fan clear of this range can reduce the feeling of something foreign. Thus providing the fan at the position where the fan is not likely to give the feeling of something foreign makes it possible to increase comfort and allows the use of a thin type cover member, making it possible to further contribute to a reduction in weight of the vehicle seat.

Further, preferably, the biosignal measurement device which obtains the biosignal from the seat occupant is provided, and the driving of the fan of the ventilation mechanism is controlled based on the biological state found through the analysis of the biosignal. This can make the clothing microclimate a comfortable thermal environment which differs depending on each individual.

BRIEF DESCRIPTION OF DRAWINGS

FIG. 17 is a chart illustrating a change in the surface temperature of the seat back which is measured while the fans of the ventilation mechanisms are operated.

DESCRIPTION OF EMBODIMENT

Figure 1:
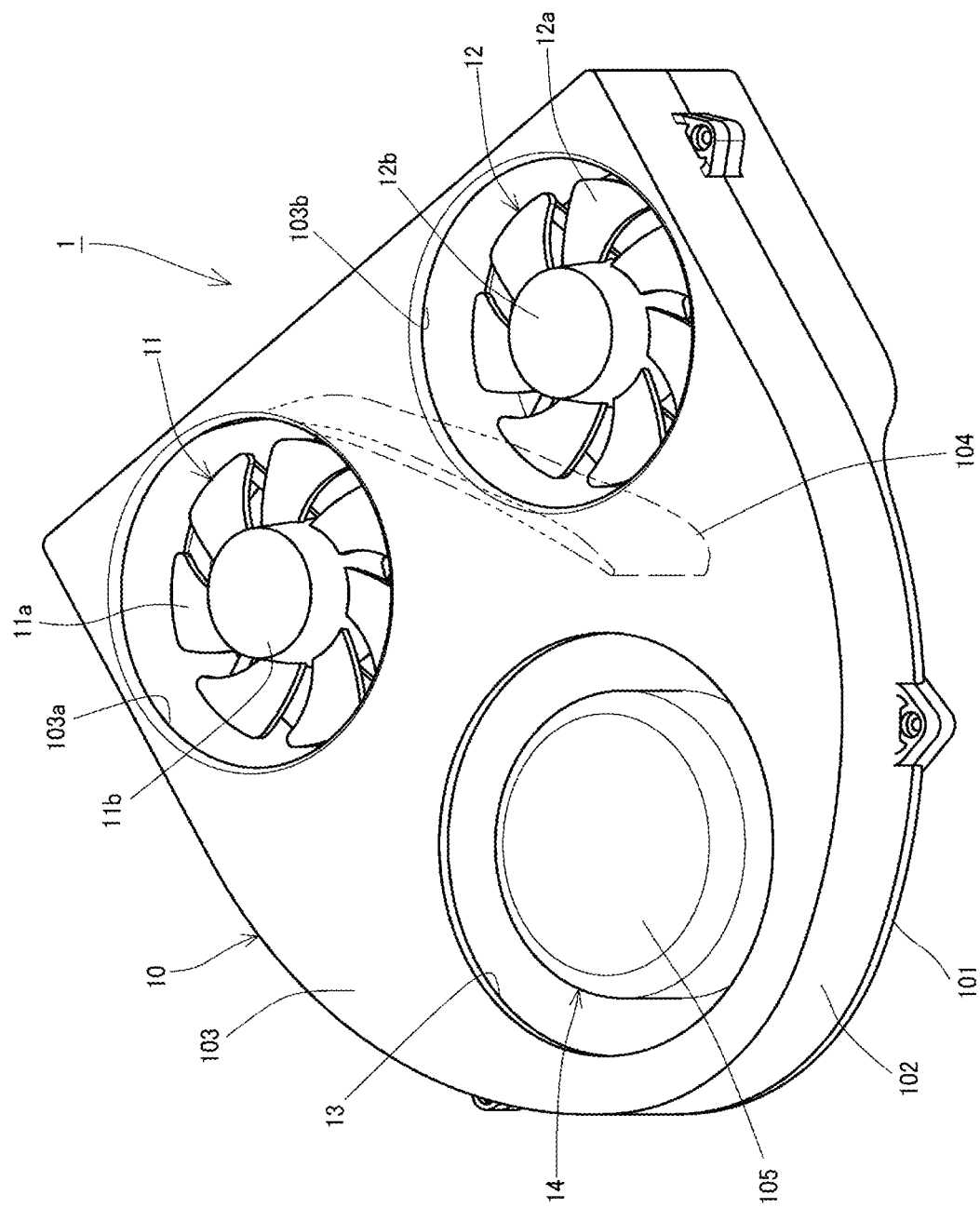
FIG. 1 is a perspective view illustrating a vehicle seat ventilation mechanism according to a first embodiment of the present invention.

The present invention will be hereinafter described in more detail based on embodiments illustrated in the drawings. FIG. 1 to FIG. 4 are views illustrating a vehicle seat ventilation mechanism 1 of one embodiment of the present invention. The ventilation mechanism 1 has a body case 10, two fans 11, 12, an exhaust port 13, and a swirling stream generation part 14.

The body case 10 has two concave plate-shaped members 10A, 10B which include concave portions 10A1, 10B1 inside, the concave plate-shaped members 10A, 10B are joined with their open surfaces facing each other, and an interior space formed by the concave portions 10A1, 10B1 is an air circulation space. The body case 10 is composed of the joined two concave plate-shaped members 10A, 10B, a wall portion corresponding to a bottom surface of the concave portion 10A1 of the concave plate-shaped member 10A is a bottom wall portion 101 of the entire body case 10, and a wall portion corresponding to a bottom surface of the concave portion 10B1 of the other concave plate-shaped member 10B is an upper wall portion 103, of the entire body case 10, located on a contact surface side with a person. Further, when the two concave plate-shaped members 10A, 10B are joined with their open surfaces facing each other, their peripheral walls 10A2, 10B2 form a peripheral wall portion 102 of the entire body case 10. In the upper wall portion 103, intake ports 103a, 103b are opened at positions corresponding to arrangement positions of the two fans 11, 12. The body case 10 is narrower in width than a seat cushion 210 or a seat back 220, and its length is shorter than the front-rear direction length of the seat cushion 210 or the up-down direction length of the seat back 220 and is preferably about 30 to 80% of the front-rear direction length of the seat cushion 210 or the up-down direction length of the seat back 220 (see FIG. 6).

Having the structure in which the fans 11, 12, the exhaust port 13, and the swirling stream generation part 14 are provided in the body case 10, the ventilation mechanism 1 of this embodiment is formed as a unit. Therefore, it is possible to impart a ventilation function to a vehicle seat 200 only by disposing the ventilation mechanism 1 as a unit in a cushioning material 212 or 222 of the seat cushion 210 or the seat back 220.

The two fans 11, 12 have a plurality of rotary blades 11a, 12a, and when they rotate, air is sucked from a front surface side to a rear surface side of the rotary blades 11a, 12a. The kind of the fans 11, 12 is not limited, but in the configuration in which the air is sucked from one side to the other side, they are disposed such that the side from which the air is sucked is located on the contact surface side with a seat occupant, of the cushioning material of the vehicle seat 200.

The two fans 11, 12 include the rotary shafts 11b, 12b which are arranged side by side in the width direction on one length-direction end side in the body case 10 to support the rotary blades 11a, 12a and are connected to motors (not illustrated), and the fans 11, 12 are disposed such that their rotary shafts 11b, 12b extend in a direction substantially perpendicular to the bottom wall portion 101. Here, in the body case 10, the distance (sign H in FIG. 3) from the upper wall portion 103 having the intake ports 103a, 103b to the bottom wall portion 101 is preferably short and is preferably set to 2 to 3 cm or less, though depending on the performance of the fans 11, 12. With this setting, the air sucked as a result of the rotation of the rotary blades 11a, 12a of the fans 11, 12 almost entirely flows toward the exhaust port 13 in the body case 10 after coming into contact with the bottom wall portion 101, and if the distance from the intake ports 103a, 103b to the bottom wall portion 101 is short, the sucked air is partly reflected by the bottom wall portion 101 to flow reversely toward the intake ports 103a, 103b. As a result, the air stream is not only supplied to the outside of the body case 10 through the exhaust port 10 but also partly supplied to the outside through the intake ports 103a, 103b.

The exhaust port 13 is provided at a position apart from the fans 11, 12 in a plan view, with its opening facing the contact surface between the cushioning material 212 or 222 of the seat cushion 210 or the seat back 220 and the seat occupant (that is, facing upward in the seat cushion 210 and facing forward in the seat back 220). In this embodiment, the exhaust port 13 is formed in the upper wall portion 103 of the body case 10 together with the intake ports 103a, 103b corresponding to the fans 11, 12. The fans 11, 12 and the intake ports 103a, 103b are provided on the length-direction one end side of the body case 10 as described above, and the exhaust port 13 is provided at a position a predetermined distance apart therefrom toward the length-direction other end side.

The distance between the fans 11, 12 (intake ports 103a, 103b) and the exhaust port 13 may be any, but the distance from the rotation centers of the fans 11, 12 to the center of the exhaust port 13 is preferably within a range of 10 to 30 cm, and more preferably within a range of 10 to 20 cm. Further, in the seat cushion 210, preferably, the rotation centers of the fans 11, 12 (intake ports 103a, 103b) are located clear of ranges with a predetermined body pressure distribution or higher including design positions corresponding to the ischial tuberosities of a person and are located more rearward or forward than these ranges. Being clear of the ranges with a high body pressure distribution, the fans 11, 12 are unlikely to give a feeling of something foreign.

In this embodiment, the rotation centers of the fans 11, 12 are located more rearward than the aforesaid ranges with the predetermined body pressure distribution or higher, and in this case, if the distance between the fans 11, 12 and the exhaust port 13 is set as above, the position of the exhaust port 13 is near the thighs. Since the vicinity of the thighs easily sweats, generating a large amount of the air stream at this position on the rear surface side beyond the contact surface efficiently cools or promotes drying of a place corresponding to the vicinity of the thighs, which is effective for reducing heat, humidity, and the like near the thighs. In a case where the rotation centers of the fans 11, 12 are located more forward than the aforesaid range with the predetermined body pressure distribution or higher as in a later-described embodiment illustrated in FIG. 14, it is possible to promote a reduction in heat, humidity, or the like near the thighs by disposing the fans 11, 12 near the front edge of the seat cushion 210 and disposing the exhaust port 13 at the rear thereof.

Figure 6:
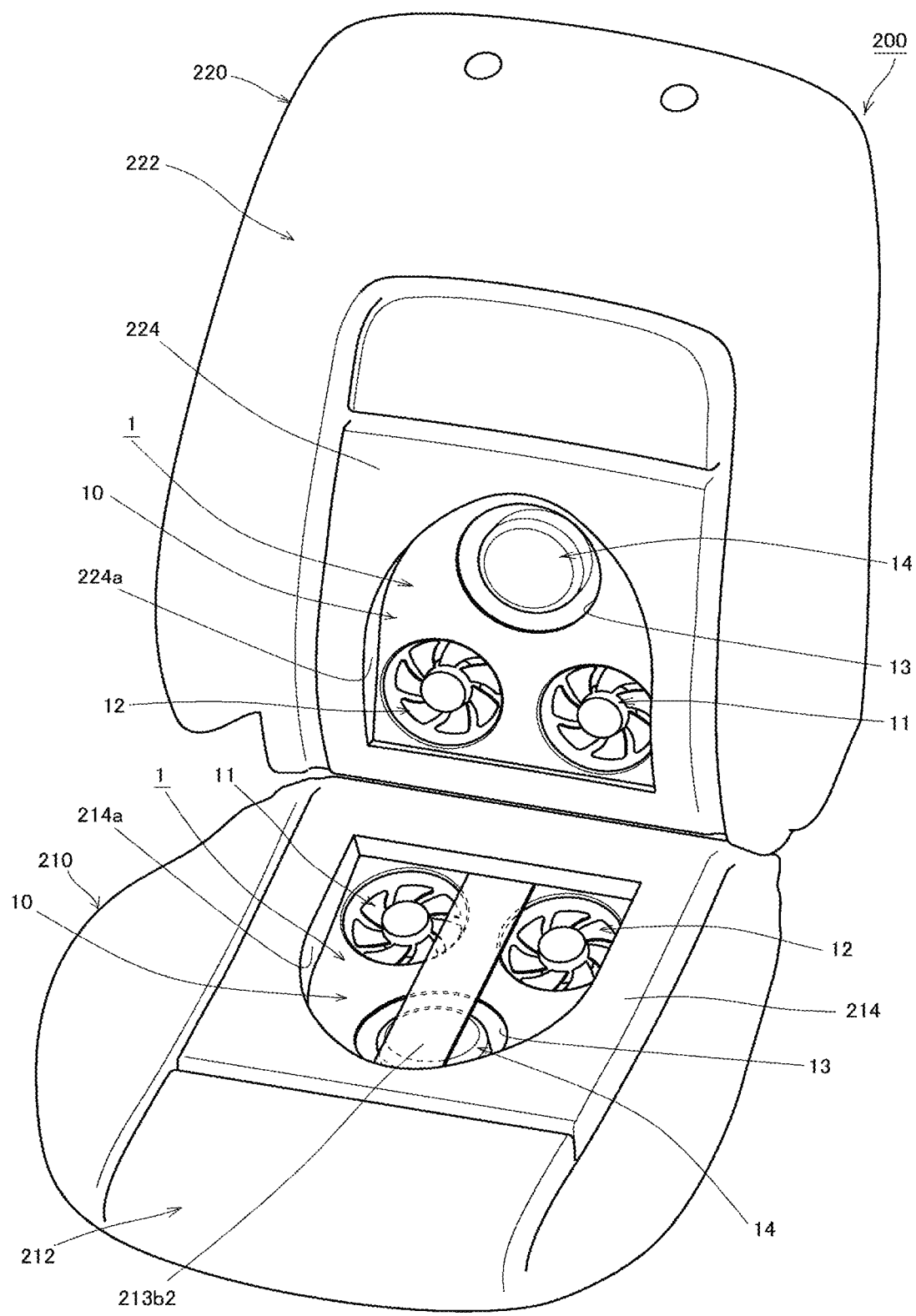
FIG. 6 is a front view illustrating the vehicle seat in FIG. 5, with the pad materials and the ventilation mechanisms disposed therein.
Figure 14:
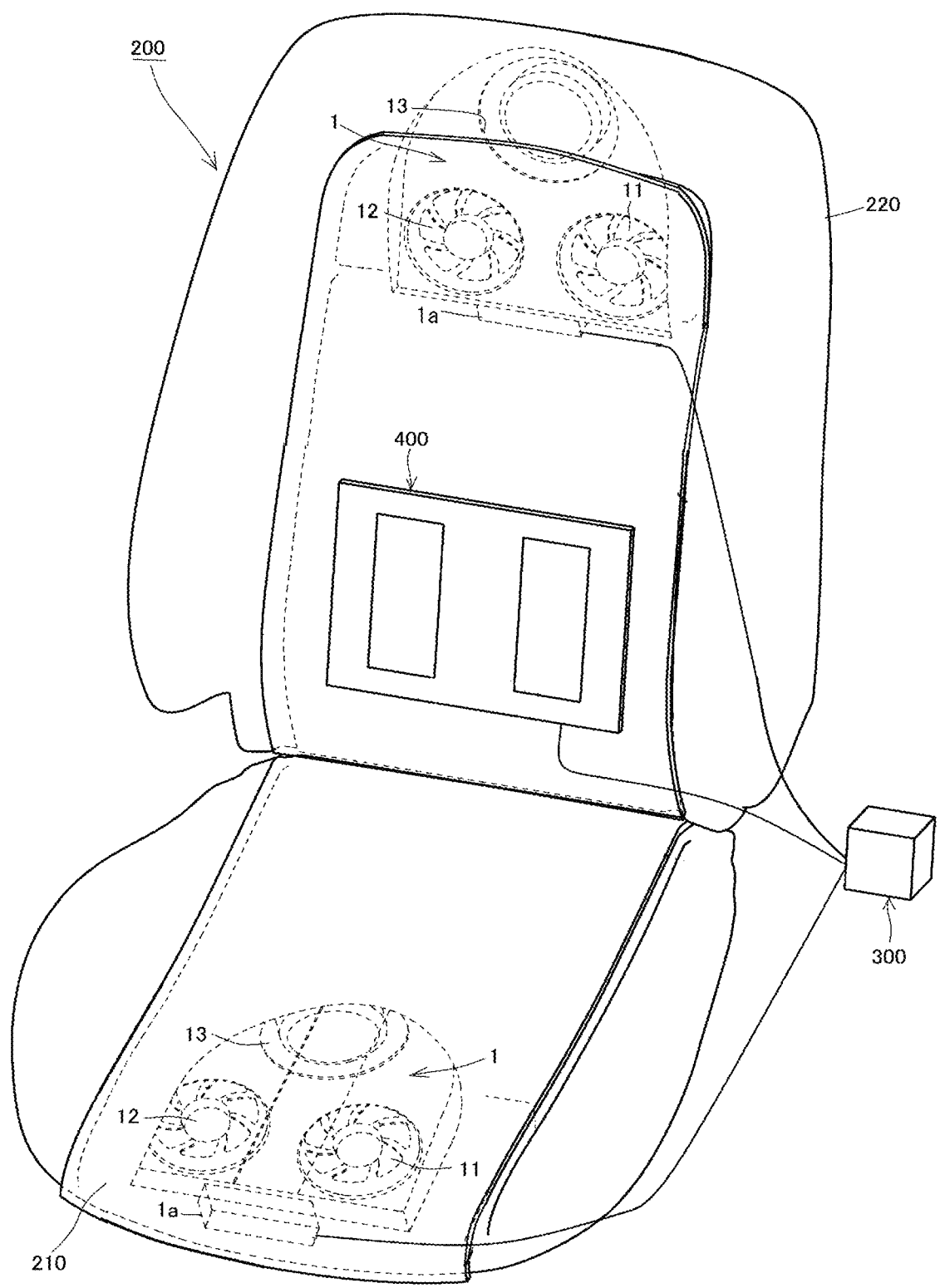
FIG. 14 is an explanatory view of another embodiment in which the ventilation mechanisms are operated using the biological state analysis device.

In a case where the ventilation mechanism 1 is assembled in the seat back 220, preferably, the rotation centers of the fans 11, 12 (intake ports 103a, 103b) are located clear of a range with a predetermined body pressure distribution or higher including a design position corresponding to the upper part of the pelvis of a person and are located below this range as in this embodiment or are located above this range as in the later-described embodiment illustrated in FIG. 14. In the seat back 220 as well, being clear of the range with a high body pressure distribution, the fans 11, 12 are unlikely to give a feeling of something foreign. Further, in either of these cases, a preferable posture is such that the position of the fans 11, 12 is set on a relatively lower side and the position of the exhaust port 13 is set on a relatively upper side as illustrated in FIG. 6, FIG. 14, and so on. It is possible to generate a large amount of the air stream near a person's shoulder on the rear surface side of the contact surface, which is effective for reducing seat occupant-side heat, humidity, and the like in a range from the shoulder to the vicinity of the neck.

Figure 2:
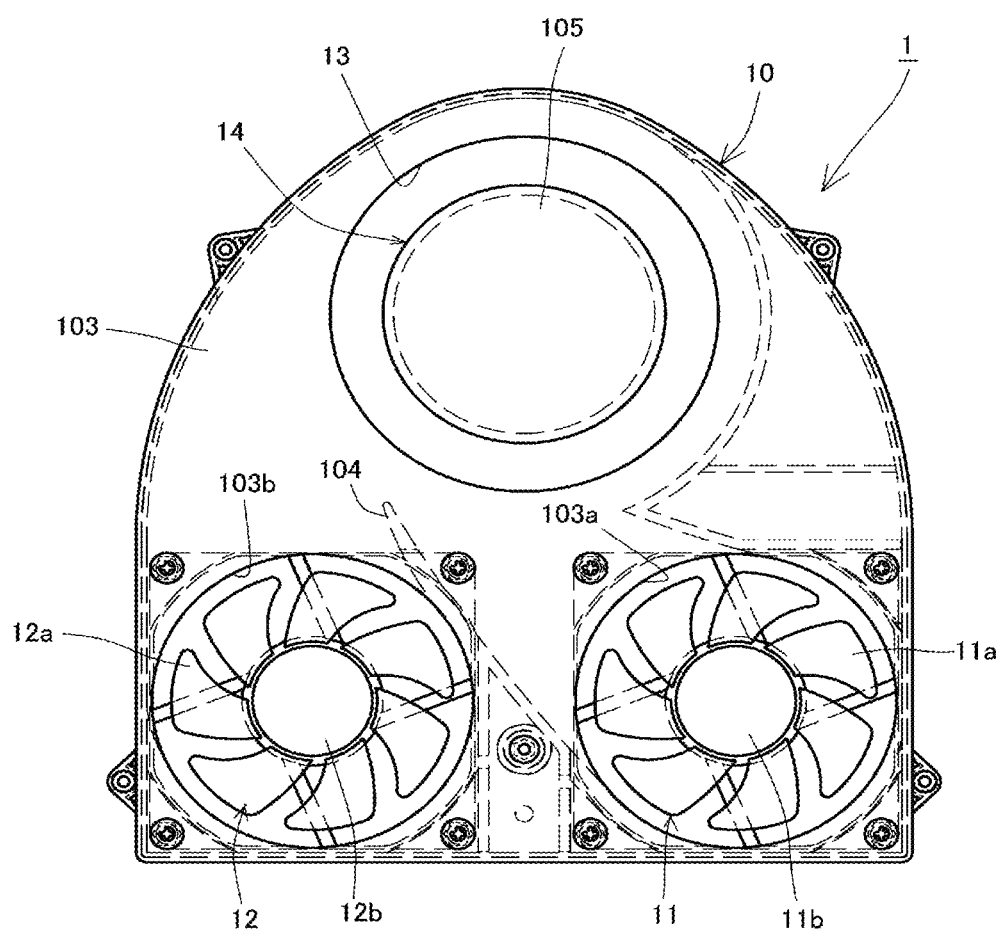
FIG. 2 is a plan view of FIG. 1.
Figure 3:
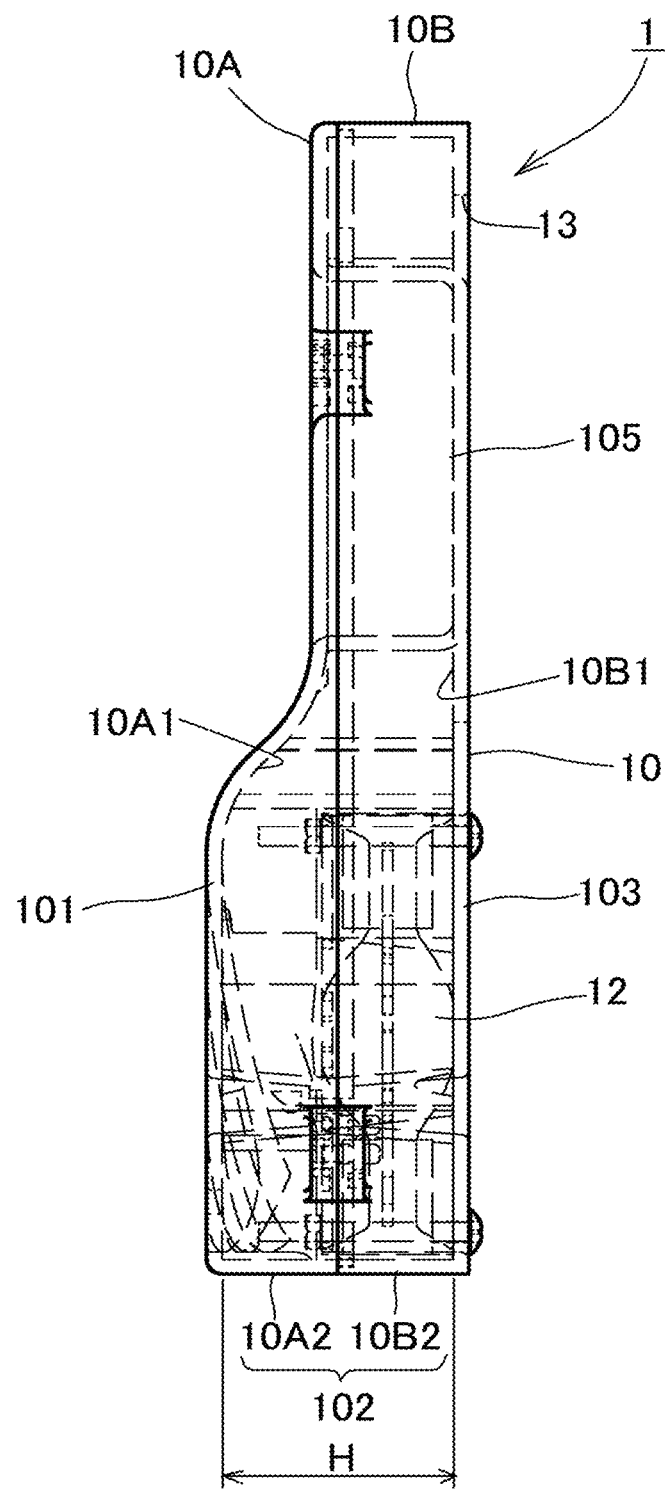
FIG. 3 is a side view of FIG. 1.
Figure 4:
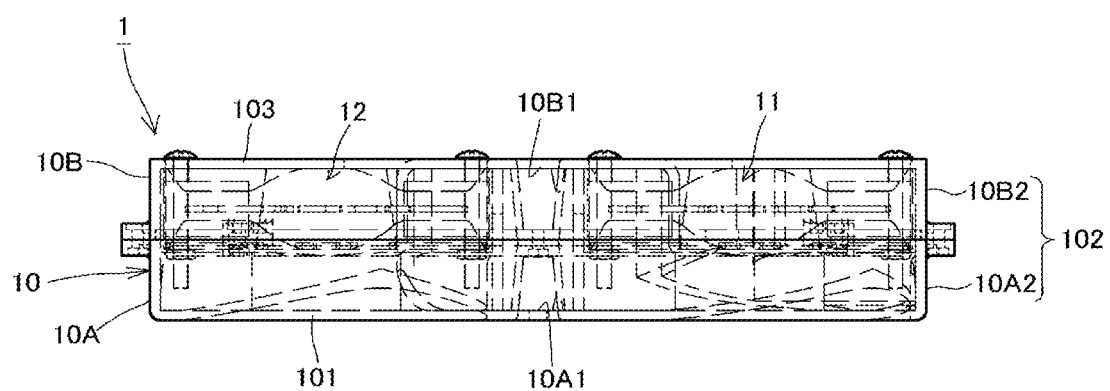
FIG. 4 is a rear view of FIG. 1.
Figure 5:
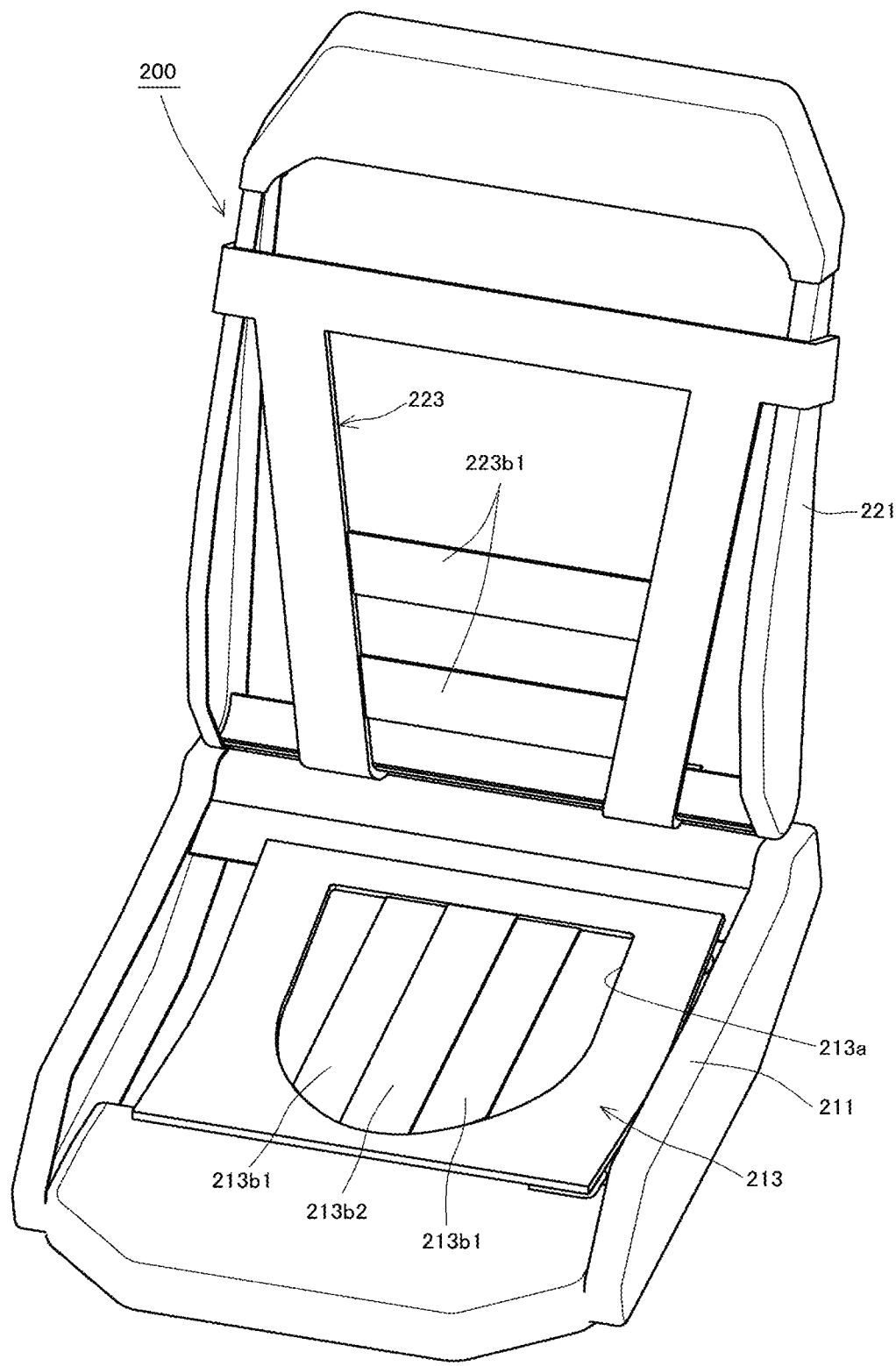
FIG. 5 is a perspective view illustrating a vehicle seat in which the aforesaid ventilation mechanisms are to be installed, with cover members and pad members being removed.

Here, in the body case 10, a guide wall 104 is provided to make the air sucked by the fans 11, 12 easily flow toward the exhaust port 13 in the air circulation space surrounded by the bottom wall portion 101, the peripheral wall portion 102, and the upper wall portion 103. As illustrated in FIG. 2, in a plan view, the guide wall 104 is substantially arc-shaped and extends to project toward the exhaust port 13. Accordingly, the air sucked by the fan 11 tries to diffuse toward the peripheral wall portion 102 but is restricted by the guide wall 104 to flow in a swirling manner. Further, as illustrated in FIG. 2, in the peripheral wall portion 102, its portion close to the exhaust port 13 is formed in a substantially semicircular shape in a plan view. Accordingly, the air sucked by the other fan 12 also diffuses toward the peripheral wall portion 102 but is restricted by the peripheral wall portion 102 to flow in a swirling manner.

The opening of the exhaust port 13 is substantially circular, and a cylindrical portion 105 substantially concentric with the exhaust port 13 and smaller in outside diameter than the exhaust port 13 in a plan view is provided upright on the bottom wall portion 101. The air sucked by the fans 11, 12 is restricted by the guide wall 104 and the peripheral wall portion 102 to be the swirling stream as described above, and owing to such a cylindrical portion 105, in a lower part of the exhaust port 13, the stream of the air sucked by the fans 11, 12 becomes a swirling stream swirling around the cylindrical portion 105, and the swirling stream is discharged from the exhaust port 13. Therefore, when the air is discharged as the swirling stream from the exhaust port 13, it becomes a turbulence on the vehicle seat 200 side which is the rear surface side of the contact surface to promote a reduction in temperature and humidity of the microclimate condition on the vehicle seat 200 side, thereby making it easy to form a comfortable microclimate condition. Further, in a case where a hole is formed in the contact surface, the swirling stream can efficiently stir an air layer near the body surface through this hole to increase the effect of reducing heat, humidity, and the like, leading to an improvement in comfort. In this embodiment, the swirling stream generation part 14 is composed of the combination of the cylindrical portion 105 with the peripheral portion 102 and the guide wall 104 of the body case 10.

FIG. 5 to FIG. 8 are views illustrating the vehicle seat 200 in which the ventilation mechanisms 1 of this embodiment are assembled. In the vehicle seat 200, the ventilation mechanisms 1 are assembled in the seat cushion 210 and the seat back 220 respectively.

The seat cushion 210 has a cushion frame 211 and the seat cushion cushioning material 212 provided on the cushion frame 211. The cushioning material 212 includes a base net 213, a urethane pad material 214, and a cover member 215. The base net 213 is formed of a two-dimensional net, a three-dimensional knitted fabric, or the like, and its peripheral edge portion is supported by the cushion frame 211. In this embodiment, in the base net 213, a hole portion 213a is penetratingly formed which has a shape similar to the shape of the body case 10 of the ventilation mechanism 1, that is, has a substantially semi-elliptical shape whose side corresponding to the minor axis of the ellipse is located near a rear edge portion and whose arc portion is located near a front edge portion side. In the hole portion 213a, rubber bands 213b1, 213b2 as elastic members extend between the rear edge portion and the front edge portion of the cushion frame 211. The rubber bands 213b1 and the other rubber band 213b2 are stacked, the ventilation mechanism 1 is mounted on the lower-layer rubber bands 213b1, and the upper-layer rubber band 213b2 is wound over the surface of the upper wall portion 103, so that the ventilation mechanism 1 can be disposed while sandwiched between the rubber bands 213b1 and the other rubber band 213b2 (see FIG. 6).

As illustrated in FIG. 6, the pad material 214 is disposed on the base net 213. In the pad material 214, a placement hole 214a is hollowed in a semi-elliptical shape whose side corresponding to the minor axis of the ellipse is located near the rear edge portion and whose arc portion is located on the front edge portion side. The ventilation mechanism 1 is placed in the placement hole 214a. On a bottom portion of the hollowed placement hole 214a, the aforesaid rubber bands 213b1, 213b2 are located. Therefore, the ventilation mechanism 1 is placed in the placement hole 214a to be disposed on the lower-layer rubber bands 213b1, and the upper-layer rubber band 213b2 is wound over the upper wall portion 103 of the body case 10.

Figure 9:
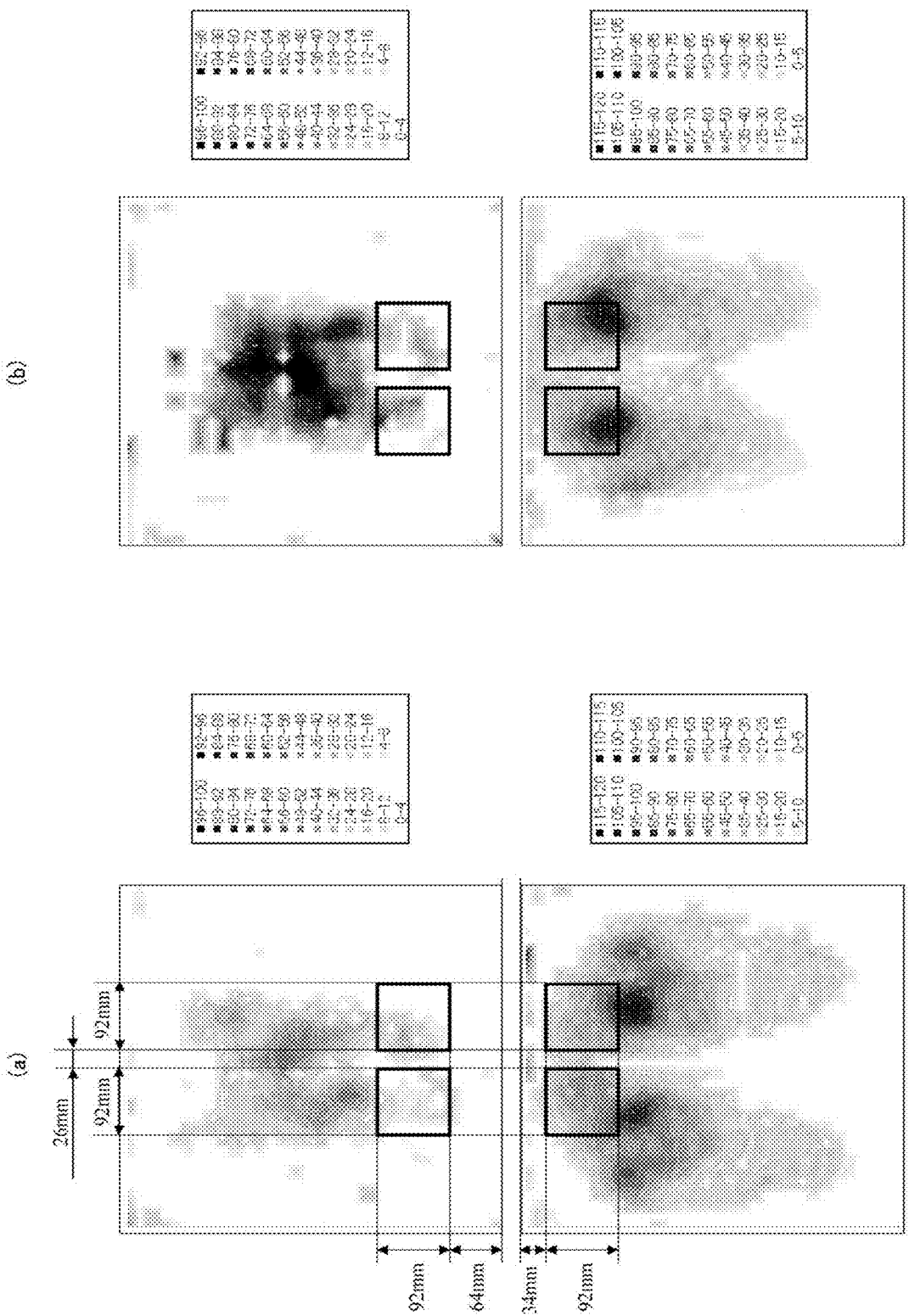
FIG. 9(a) is a chart illustrating body pressure distribution when a subject weighing 63 kg is seated on the vehicle seat, in a state in which outer layer members are further stacked on the vehicle seat illustrated in FIG. 7.
FIG. 9(b) is a chart illustrating body pressure distribution when the subject weighing 63 kg is seated on the vehicle seat in the state illustrated in FIG. 7.

The placement hole 214a is formed from the vicinity of the rear edge portion of the pad material 214 as described above, and in this embodiment, it has such a size that the rotation centers of the fans 11, 12 can be set within the ranges more rearward than the design positions corresponding to the ischial tuberosities when the ventilation mechanism 1 is placed in the placement hole 214a. Since the design positions of the ischial tuberosities are usually set within a range 100 to 180 mm apart forward from the rear edge portion, the placement hole 214a is formed such that the rotation centers of the fans 11, 12 can be set more rearward or forward than these positions. Consequently, it is possible to dispose the fans 11, 12 and the exhaust port 13 at the aforesaid preferable places in the seat cushion 210 only by placing the ventilation mechanism 1 in the placement hole 214a. FIGS. 9(a), (b) are charts illustrating examples of the body pressure distribution when a person is seated on the vehicle seat 200. In this example, in the case where the fans 11, 12 are provided more rearward than the positions corresponding to the ischial tuberosities, the fans 11, 12 are preferably provided in ranges surrounded by the quadrangles which are positions with a low body pressure distribution located more rearward than the positions corresponding to the ischial tuberosities. Note that FIG. 9(a) is a chart illustrating the body pressure distribution when a subject weighing 63 kg is seated, in a state in which another three-dimensional knitted fabric is stacked as an outer layer member on the cover member 215 (three-dimensional knitted fabric with a 7 mm thickness) of the vehicle seat 200 in the state illustrated in FIG. 7, and FIG. 9(b) is a chart illustrating the body pressure distribution when the same subject is seated on the vehicle seat 200 in the state illustrated in FIG. 7.

The cover member 215 is supported by the cushion frame 211 while covering the ventilation mechanism 1 and the pad material 214 after the ventilation mechanism 1 is placed in the placement hole 214a of the pad material 214. In this embodiment, as illustrated in FIG. 7, the cover member 215 extends from the rear edge portion to the front edge portion of the cushion frame 211, and as illustrated in FIG. 8(a), side edge portions of the cover member 215 are supported by side frames 211a of the cushion frame 211 using coil springs 216. Consequently, the cover member 215 is provided while pulled with a predetermined tension. As at least part of the cover member 215, an air permeable material is preferably used, and to ensure the cushioning property, it is more preferable to use a three-dimensional fabric, and it is most preferable to use a three-dimensional knitted fabric. Further, the three-dimensional knitted fabric may be used alone or a stack of a plurality of three-dimensional knitted fabrics may be used. Further, a stack of the three-dimensional knitted fabric and an air-permeable two-dimensional fabric, another three-dimensional fabric, or the like may be used. The three-dimensional knitted fabric is formed three-dimensionally by connecting yarns reciprocating between two layers of ground knitted fabrics, and has a cushioning property large enough to support a person's load even if it is thin, for example, even if its thickness is about 3 to 20 mm, owing to the rigidity of the ground knitted fabrics, the elasticity of the connecting yarns, and so on. Therefore, the use of the three-dimensional knitted fabric as the cover member 215 makes it possible to alleviate a feeling of something foreign caused by the ventilation mechanism 1 and at the same time eliminates a need for forming special intake and exhaust holes in the cover member as is done conventionally because the three-dimensional knitted fabric itself has air permeability.

Further, if the cover member 215 having air permeability such as the three-dimensional knitted fabric is used, the air stream discharged from the exhaust port 13 flows also in a planar direction of the cover member 215 to quickly spread to a wide range. Therefore, it is possible to efficiently reduce heat and humidity in a wide range.

Figure 7:
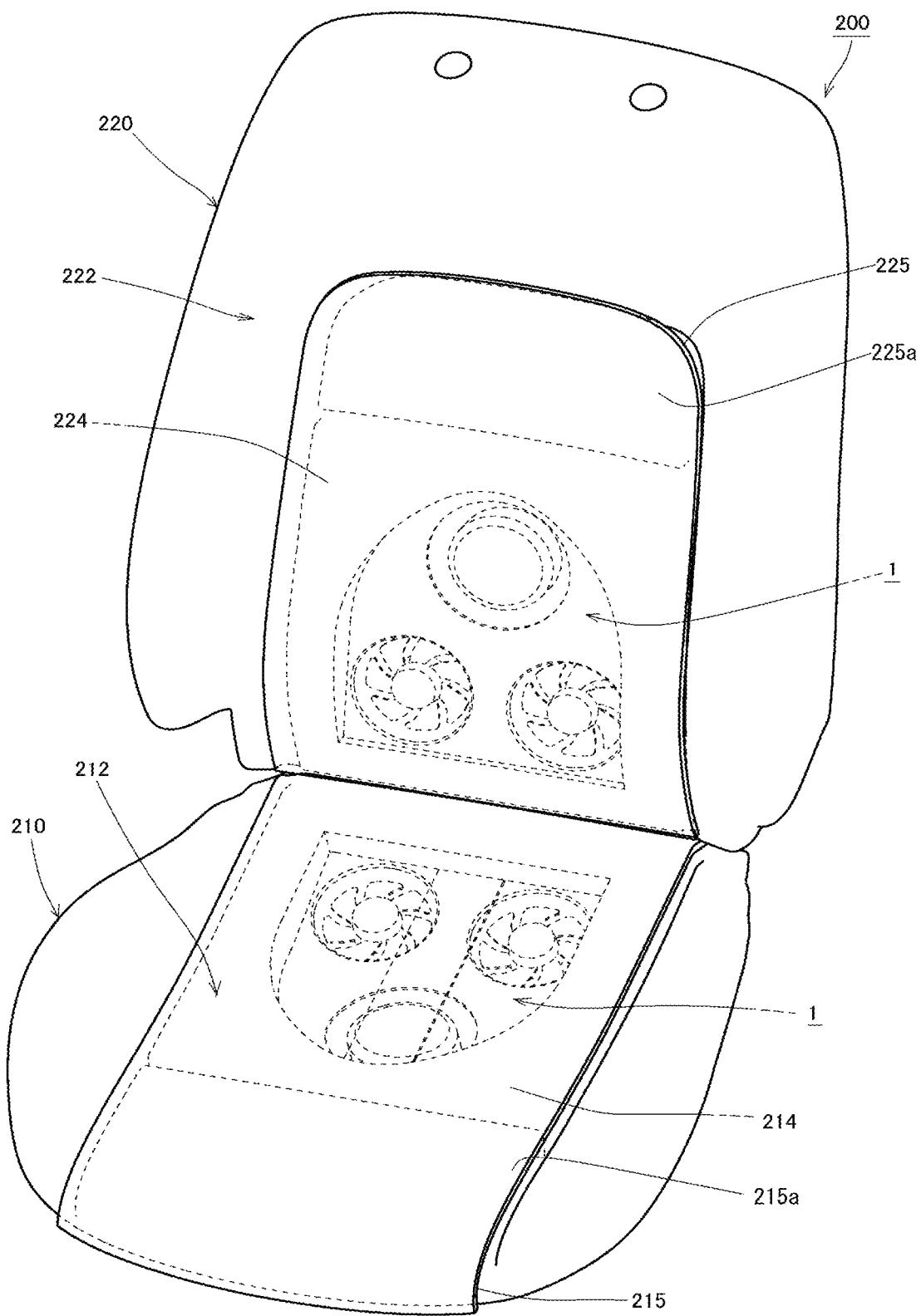
FIG. 7 is a front view illustrating the vehicle seat in FIG. 6, with the pad materials and the ventilation mechanisms being covered with the cover members.
Figure 8:
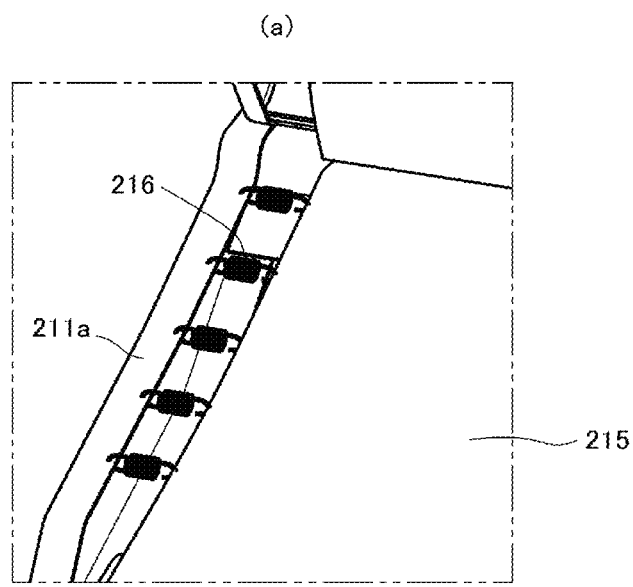
FIG. 8(a) is a view illustrating a part where the cover member of a seat cushion is extended on a cushion frame.
FIG. 8(b) is a view illustrating a part where the cover member of the seat back is extended on a back frame.
Figure 8:
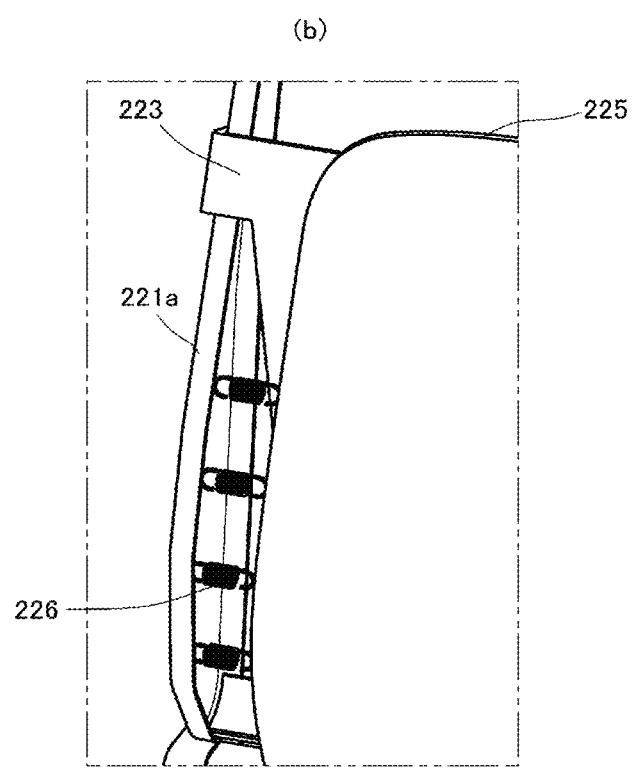

Note that the meaning of the cover member 215 in this embodiment includes an outer layer member 215a, 225a disposed on the outermost layer of the cushioning material 212 and becoming the contact surface with the seat occupant as illustrated in FIG. 7. As the outer layer member 215a, 225a, the three-dimensional knitted fabric forming the cover member 215 can be used as it is, but typically, a different outer layer member 215a, 225a covering the cover member 215 is used.

Here, in this embodiment, the air streams are generated on the vehicle seat 200 sides which are the rear surface sides of the outer layer members 215a, 225a being the contact surfaces on which the ventilation mechanisms 1 are disposed, the air streams form microclimate conditions having comfortable thermal environments, and the microclimate conditions on the seat occupant sides which have become uncomfortable thermal environments are replaced with the aforesaid microclimate conditions owing to the effect of heat conduction or the like through the outer layer members 215a, 225a. Therefore, the outer layer members 215a, 225a need not have intake and exhaust holes as are needed conventionally. That is, the ventilation mechanism 1 of this embodiment promotes, by the air stream generated on the vehicle seat 200 side, the replacement of the uncomfortable microclimate condition on the seat occupant side with the comfortable microclimate condition formed by the air stream flowing on the vehicle seat 200 side, to play a role of maintaining dynamic equilibrium between these, thereby enhancing the comfort of the clothing microclimate of the seat occupant side.

Incidentally, as the outer layer members 215a, 225a, those having intake and exhaust holes can also be used, and in this case, the three-dimensional knitted fabric itself may be used as it is as described above. In a case where the outer layer members 215a, 225a have the intake and exhaust holes, the air streams adjusted to the comfortable thermal environments on the vehicle seat 200 sides act on the seat occupant to be capable of enhancing the comfort of the clothing microclimate.

Figure 10:
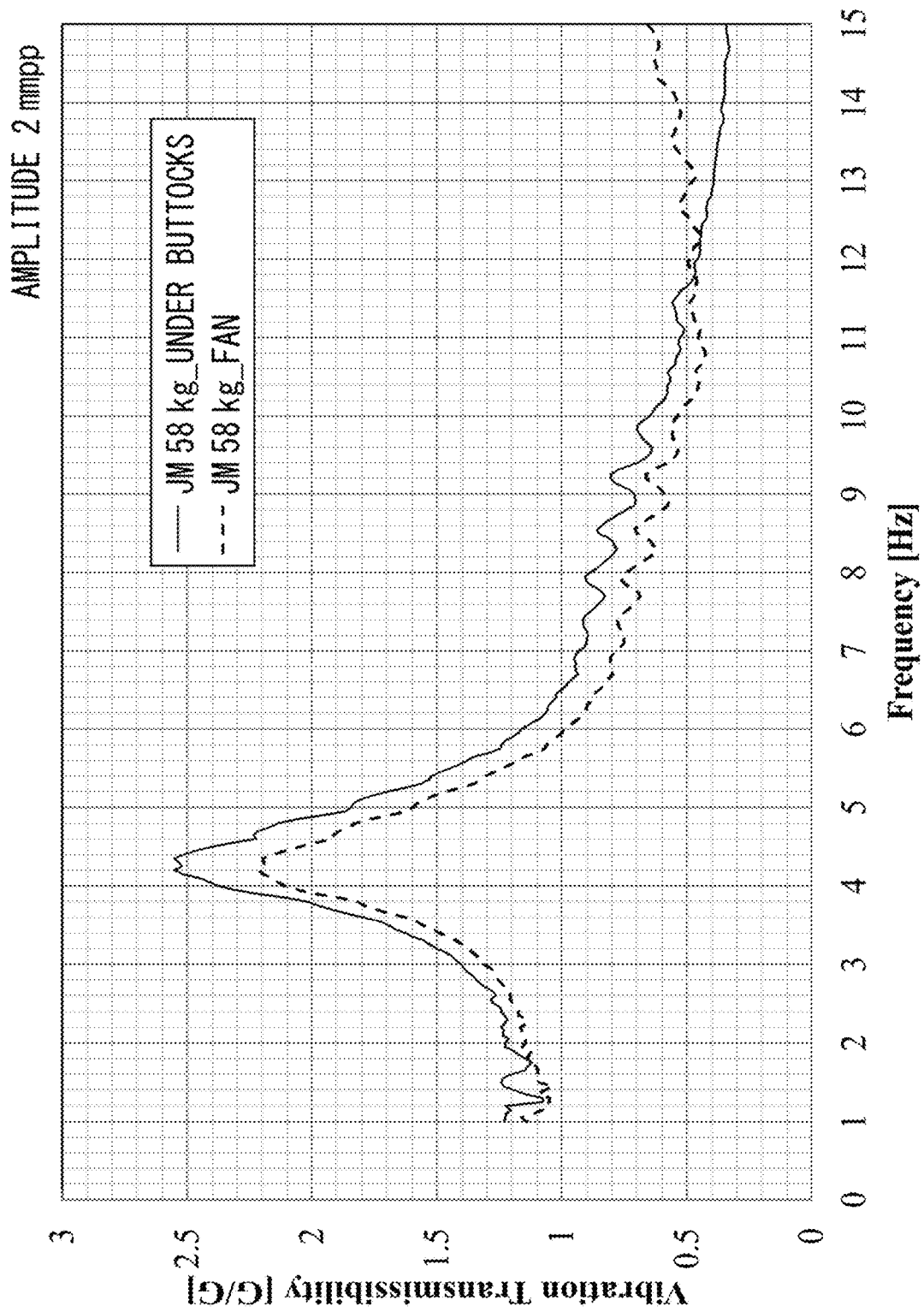
FIG. 10 is a chart illustrating the vibration transmissibility when a subject weighing 58 kg is seated.
Figure 11:
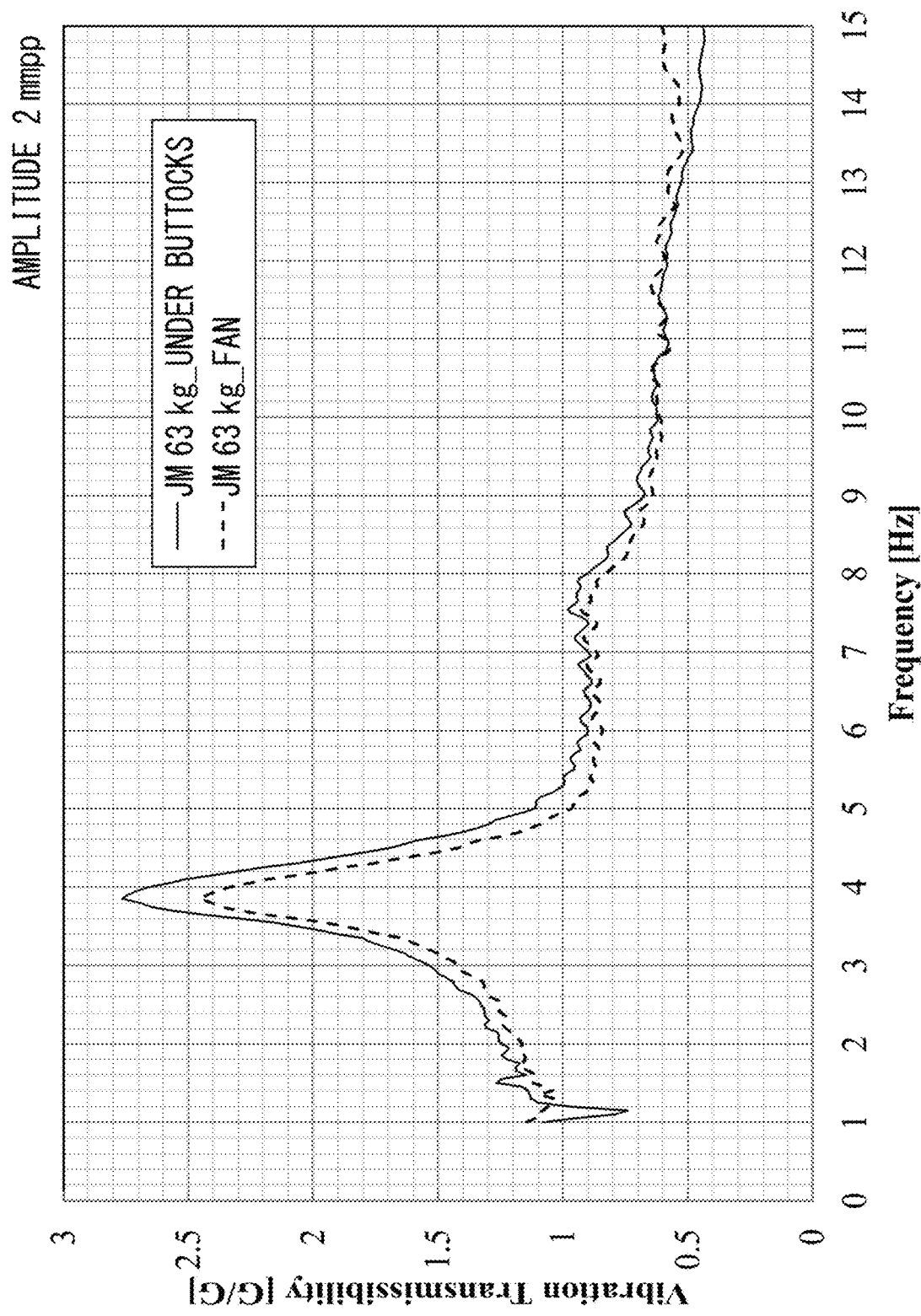
FIG. 11 is a chart illustrating the vibration transmissibility when a subject weighing 63 kg is seated.

Here, FIG. 10 and FIG. 11 are charts illustrating vibration transmissibility when a subject weighing 58 kg and a subject weighing 63 kg are each seated on the cover member 215 formed of the three-dimensional knitted fabric (7 mm thickness), followed by the application of vibration having an amplitude peak-to-peak distance of 2 mm. The solid line represents data of an acceleration pickup attached on the cover member 215 under the buttocks of the subject, and the broken line represents data of an acceleration pickup attached to the fan 11. Note that these data are measured when the fans 11, 12 and the exhaust port 13 are disposed in the seat cushion 210 such that the fans 11, 12 are located more rearward than the ranges corresponding to the ischial tuberosities as illustrated in FIG. 6 and FIG. 7. From these data, it is seen that, according to the configuration of this embodiment, the vibration transmissibility at the buttocks of the subject and the vibration transmissibility at the fans 11, 12 move in the same phase, and since the resonance peak of the fans 11, 12 is low, the acceleration of the fans 11, 12 is small, which is a structure not easily give the subject a feeling of something foreign caused by the fans 11, 12.

As illustrated in FIG. 5 to FIG. 8, the seat back 220 has a back frame 221 and a seat back cushioning material 222 provided on the back frame 221. The configuration of the cushioning material 222 is substantially the same as that of the aforesaid seat cushion cushioning material 212, but a base net 223 is formed in a belt shape and is provided in a substantially quadrangular frame shape on the back frame 221 (see FIG. 5). On the base net 223, rubber bands 223b1 as elastic members extend in the left-right direction (see FIG. 5). On the base net 223, a urethane pad material 224 is stacked (see FIG. 6) and is covered with a cover member 225 (see FIG. 7). In the pad material 224, a placement hole 224a is penetratingly formed in a substantially semi-elliptical shape whose side corresponding to the minor axis of the ellipse is located near a lower edge portion and whose arc portion is located on an upper edge portion side, and the rubber bands 223b1 are located on a bottom portion of the placement hole 224a. Therefore, when the ventilation mechanism 1 is placed in the placement hole 224a, the ventilation mechanism 1 is elastically supported by the rubber bands 223b1. As illustrated in FIG. 8(b), side edge portions of the cover member 225 are tensely provided on side frames 221a of the back frame 221 with coil springs 226 therebetween, making it difficult for the ventilation mechanism 1 to give a feeling of something foreign. Note that the other configuration, material, and so on of the cover member 225 are the same as those of the above-described cover member 215 for the seat cushion.

In this embodiment, the placement hole 224a of the seat back 220 is formed from the vicinity of the lower edge portion of the pad material 224 and is formed with such a size that the rotation centers of the fans 11, 12 can be set in a range lower than a range with a predetermined body pressure distribution or higher including a design position corresponding to the upper part of the pelvis when the ventilation mechanism 1 is placed in the placement hole 224a. Since the design position corresponding to the upper part of the pelvis is usually set within a range 120 to 200 mm apart upward from the lower edge portion, the placement hole 224a is formed such that the rotation centers of the fans 11, 12 can be set lower than this position. Consequently, it is possible to dispose the fans 11, 12 and the exhaust port 13 at the aforesaid preferable places also in the seat back 220 only by placing the ventilation mechanism 1 in the placement hole 224a. Referring to the body pressure distributions in FIGS. 9(a), (b), ranges with a predetermined body pressure distribution or higher (this is a body pressure distribution including the body pressure distribution at the position corresponding to the upper part of the pelvis and is a value optionally set at the time of designing) are present in the range including the position corresponding to the upper part of the pelvis, but below these ranges, ranges with a low body pressure distribution surrounded by the quadrangles are present. Therefore, the fans 11, 12 are preferably provided in the ranges surrounded by the quadrangles. Incidentally, since places near the shoulder have ranges with a body pressure distribution whose value is lower than that in the range with the predetermined body pressure distribution or higher including the upper part of the pelvis, it is also preferable to set the rotation centers of the fans 11, 12 near the shoulder where the body pressure distribution is lower than the predetermined body pressure distribution or higher in the range including the upper part of the pelvis as in the later-described embodiment illustrated in FIG. 14.

According to this embodiment, for example, the fans 11, 12 are driven by the operation of an operation switch (not illustrated) electrically connected to a control unit which controls the driving of the fans 11, 12. Instead, the fans 11, 12 are linked with the interior temperature or humidity and are automatically driven when, for example, the temperature or humidity reaches a predetermined value. When the fans 11, 12 are driven, the air is sucked from the intake ports 103a, 103b into the body case 10 including the bottom wall portion 101, the peripheral wall portion 102, and the upper wall portion 103. In the body case 10, the sucked air flows in the air circulation space surrounded by the bottom wall portion 101, the peripheral wall portion 102, and the upper wall portion 103, swirls around the cylindrical portion 105 included in the swirling stream generation part 14, and is discharged from the exhaust port 13. In this embodiment, the ventilation mechanism 1 is thus formed as a unit and has not only the intake function by the fans 11, 12 but also the exhaust function through the exhaust port 13. Therefore, to impart the ventilation function to the seat cushion 210 and the seat back 220, only by setting the ventilation mechanisms 1 each formed as a unit in the placement holes 214a, 224a provided in the pad materials 214, 224, it is possible to form the air streams which create the comfortable thermal environments on the vehicle seat 200 sides.

In the above-described embodiment, the two fans 11, 12 are used and the exhaust port 13 is disposed at one place, but the number of the fans disposed may be one or may be three or more as long as the fan has the intake function and the exhaust function and is capable of generating the swirling stream at the time when the air is discharged. The number of the exhaust ports formed may also be plural. Further, in the above-described embodiment, the ventilation mechanisms 1 are disposed in the seat cushion 210 and the seat back 220 respectively, but the ventilation mechanism 1 may of course be disposed in one of these. Further, in the above-described embodiment, the cylindrical portion 105 is provided to generate the swirling stream, but the air stream discharged from the exhaust port 13 does not necessarily have to be the swirling stream because the present invention enhances the comfort of the clothing microclimate of the seat occupant by not only sucking the air but also discharging the air to generate the air stream on the vehicle seat 200 side where the ventilation mechanism 1 is disposed, to thereby create the comfortable microclimate condition on the vehicle seat 200 side, and making the comfortable microclimate condition act on the seat occupant side. However, the air easily flows in the vehicle seat 200 by being turned into the swirling stream, making it possible to create a comfortable environment on the vehicle seat 200 side in a wider range.

Figure 12:
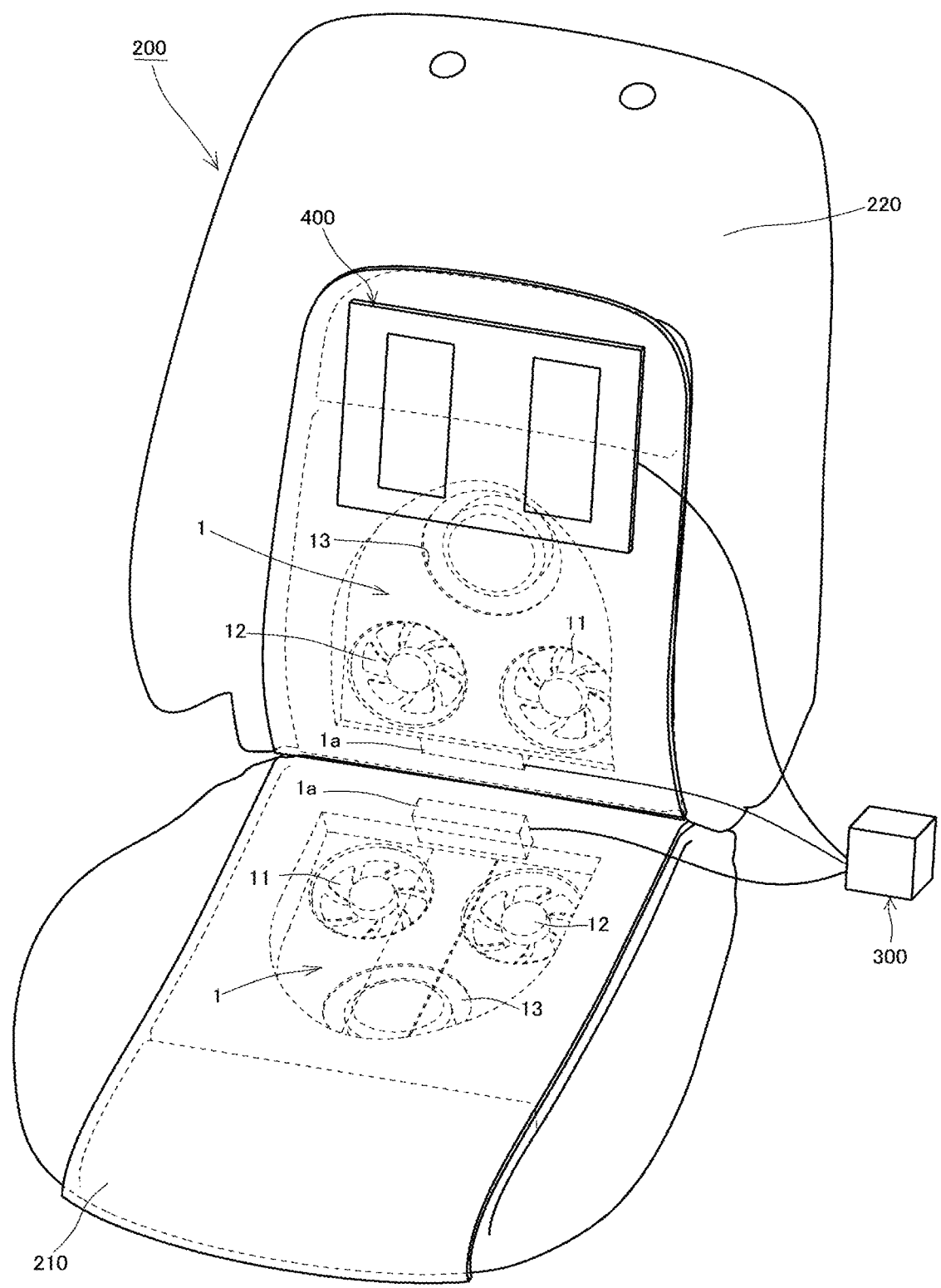
FIG. 12 is an explanatory view of an embodiment in which the ventilation mechanisms are operated using a biological state analysis device.

FIG. 12 is a view illustrating the schematic structure of an embodiment in which the ventilation mechanisms 1 are automatically controlled. In this embodiment, a signal is sent to drive control units 1a based on information from a biological state analysis device 300 which analyzes the state of a seat occupant, for example, his/her biological state such as sleepiness, fatigue degree, heart rate, respiratory rate, body temperature, blood pressure, and sweat volume, and the driving of the ventilation mechanisms 1 is controlled. If the biological state analysis device 300 determines that, for example, the sleepiness or the fatigue degree is on a predetermined level, the fans 11, 12 of the ventilation mechanisms 1 are put into operation, and the air streams change the temperature, humidity, or the like of the outer layer members 215a, 225a which are the contact surfaces with the seat occupant, making it possible to awaken the seat occupant. Further, when a higher heart rate or respiratory rate than a normal rate is detected or a rise in the body temperature, an increase in the sweat volume, or the like is detected, the ventilation mechanisms 1 are operated, which can contribute to a reduction in the body temperature rise, the sweat volume increase, or the like. Further, it is also possible to adjust an air flow rate level of the air streams discharged from the exhaust ports 13, by the drive control units 1a controlling the rotation speed of the fans 11, 12 according to a variation level of autonomic nervous activity, heart rate variability, blood pressure variability, or the like.

Figure 13:
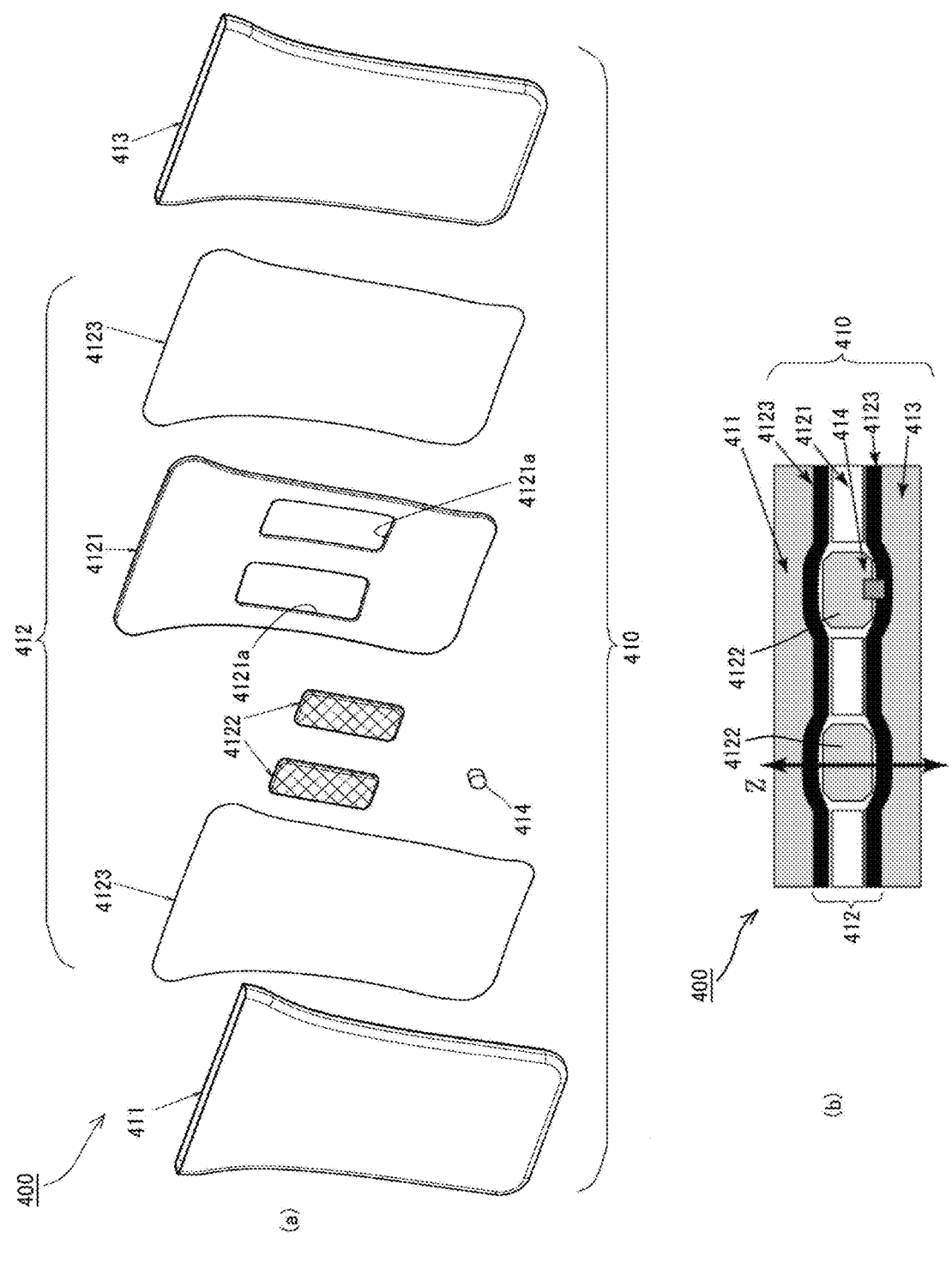
FIGS. 13(a), (b) are views illustrating an example of a biosignal measurement device.

The biological state analysis device 300 only needs to be capable of analyzing and determining various biological states such as the aforesaid sleepiness, fatigue degree, and heart rate, and its kind is not limited. However, it is preferable to use, as one applicable to the vehicle seat 200, a biosignal measurement device 400 used in the drowsy driving warning device (Sleep Buster (registered trademark)) manufactured by DELTATOOLING Co., Ltd. which is capable of obtaining information on the biological state in a non-constraining manner even during traveling, and perform the analysis using a biosignal obtained from this biosignal measurement device 400. As illustrated in FIG. 13, the biosignal measurement device 400 includes a biosignal detection unit 410 besides not-illustrated electrical wiring and so on, and is used with the biosignal detection unit 410 put in the seat back 220 of the vehicle seat 200.

As illustrated in FIGS. 13(a), (b), the biosignal detection unit 410 has a three-layer structure composed of a stack of a first layer member 411, a second layer member 412, and a third layer member 413 which each have a substantially rectangular shape having predetermined width and length. The first layer member 411 is formed of a three-dimensional knitted fabric or the like, and it is used while being placed on a side toward the seat occupant whose biosignal is to be detected, and the biosignal is first propagated to the first layer member 411 through the dorsal body surface of the seat occupant. The second layer member 412 functions as a resonance layer which emphasizes a weak dorsal body surface pulse wave propagated from the first layer member 411, by a resonance phenomenon or a beat phenomenon, and includes a base member 4121 formed of a bead foam or the like, three-dimensional knitted fabrics 4122 functioning as natural oscillators, and films 4123 generating membrane vibration. In the base member 4121, two placement holes 4121a, 4121a are formed at symmetrical positions sandwiching its center, and the three-dimensional knitted fabrics 4122, 4122 functioning as the natural oscillators are placed in the placement holes 4121a, 4121a. The films 4123, 4123 are stacked on surfaces of the second layer member 412 to cover exposed surfaces of the three-dimensional knitted fabrics 4122, 4122 functioning as the natural oscillators. Between one of the three-dimensional knitted fabrics 4122 and the film 4123, a microphone sensor 414 which detects vibration (sound) ascribable to the dorsal body surface pulse wave is disposed. The third layer member 413 is stacked on a side opposite to the first layer member 411 with the second layer member 412 therebetween and reduces an external vibration input. The third layer member 413 preferably has a function of damping external vibration with high frequencies of over 100 Hz. The third layer member 413 is preferably formed of a three-dimensional knitted fabric similarly to the first layer member 411 in order to have such a filtering function.

In the biological state analysis device 300, the computer program that is disclosed by the present inventors in Japanese Patent Application Laid-open No. 2011-167362, WO2011/046178, Japanese Patent Application Laid-open No. 2014-117425, Japanese Patent Application Laid-open No. 2014-223271, and so on is set, and the biological state analysis device 300 receives the biosignal obtained from the biosignal detection unit 410 to perform an arithmetic operation. Consequently, it is possible to capture information on sleepiness (a hypnagogic symptom phenomenon, an imminent sleep phenomenon, a low consciousness traveling state), a homeostasis function level, a fatigue state, a feeling state, and so on.

FIG. 14 is a view illustrating an embodiment in which the ventilation mechanisms 1 are disposed at positions different from the above. In this embodiment, in the seat cushion 210, the ventilation mechanism 1 is disposed such that the rotation centers of the fans 11, 12 are located more forward than the ranges with the predetermined body pressure distribution or higher including the positions corresponding to the ischial tuberosities. That is, the fans 11, 12 are disposed near the front edge and the exhaust port 13 is disposed at the rear thereof in the seat cushion 210. In the vicinity of the front edge, a load is small, and the fans 11, 12 are less likely to give a feeling of something foreign, and owing to the exhaust port 13 located rearward, it is possible to promote a reduction in heat, humidity, and so on near the thighs.

In the seat back 220, a place near the shoulder has ranges with a body pressure distribution having a lower value than in the range with the predetermined body pressure distribution or higher including the upper part of the pelvis (see FIG. 9), and therefore, the rotation centers of the fans 11, 12 are set in the places, near the shoulder, where the body pressure distribution is lower than the predetermined body pressure distribution or higher in the range including the upper part of the pelvis.

Incidentally, as in the above-described embodiment, the seat cushion 210 and the seat back 220 are provided with the pad materials where to dispose the ventilation mechanisms 1, and the ventilation mechanisms 1 are placed in the placement holes formed in the pad materials, and the tops thereof are covered with the cover members such as the three-dimensional knitted fabrics or the like.

In this embodiment, similarly to the above-described embodiment, it is also possible to reduce a feeling of something foreign caused by the ventilation mechanisms 1 and at the same time, by generating the air streams on the vehicle seat 200 sides to create predetermined thermal environments and replacing thermal environments on the seat occupant sides beyond the contact surfaces (outer layer members 215a, 225a) with the created predetermined thermal environments, it is possible to enhance the comfort of the clothing microclimate.

Further, in this embodiment, in the case where the biosignal measurement device 400 is provided, it is disposed at a position that is below the ventilation mechanism 1 disposed in the seat back 220 and is near the position corresponding to the lumbar part of the seat occupant as illustrated in FIG. 14.

(Experiment about Change in Surface Temperature of Seat Back 220)

Figure 15:
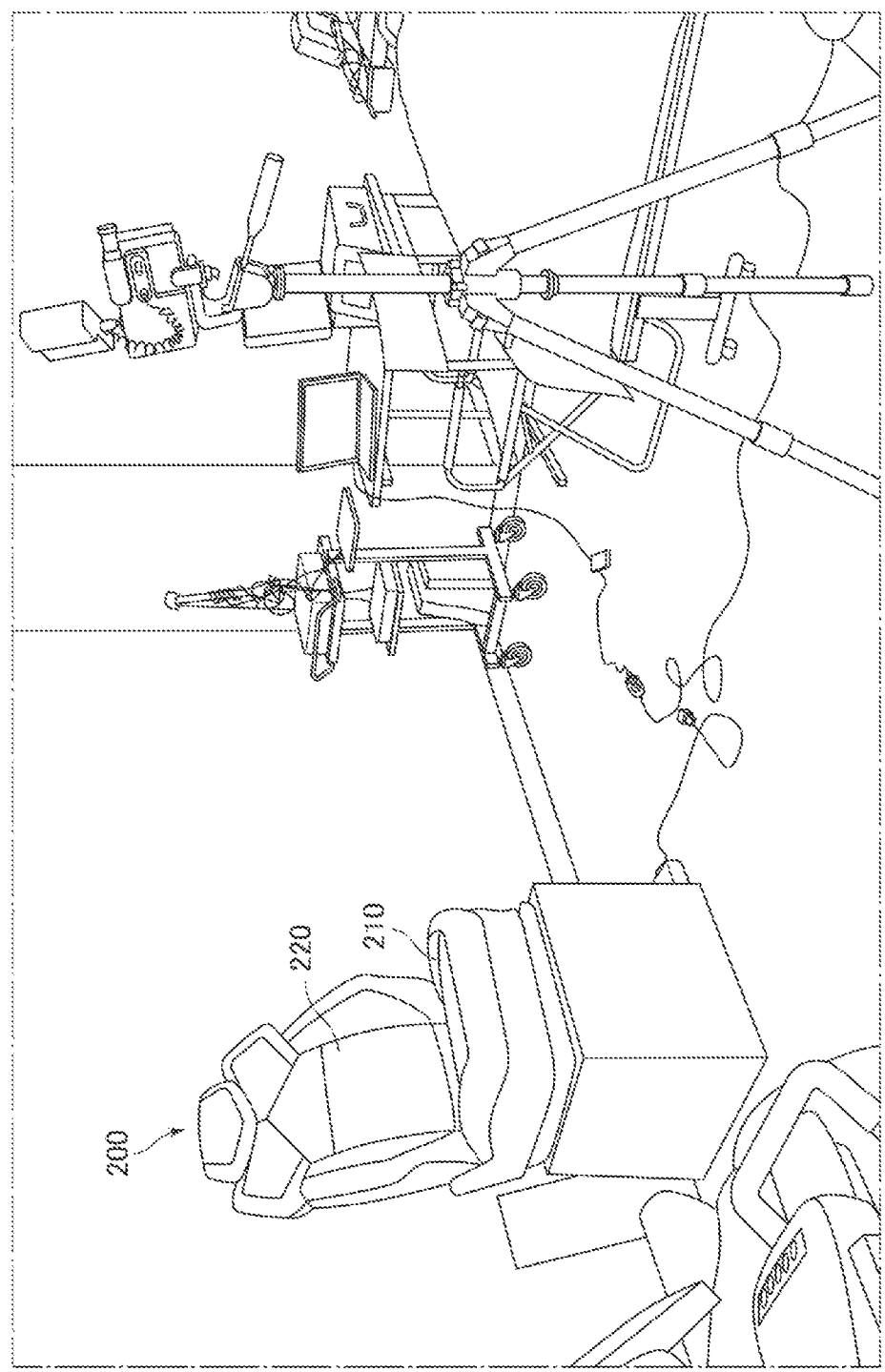
FIG. 15 is a view illustrating a laboratory scene where a change in the surface temperature of the seat back is evaluated.

As illustrated in FIG. 15, the vehicle seat 200 in FIG. 14 was installed in a windowless laboratory in which an air-conditioner temperature was set to 27° C., and a change in the surface temperature of the seat back 220 was evaluated. The vehicle seat 200 was installed at a position not directly hit by the wind of the air-conditioner, was left for thirty minutes or longer before the start of the experiment, and the experiment was started at an instant when the surface temperature of the seat back 220 of the vehicle seat 200 became substantially uniform. Note that the outer layer members of the seat cushion 210 and the seat back 220 have no through hole allowing the air to pass in the thickness direction.

Figure 16:
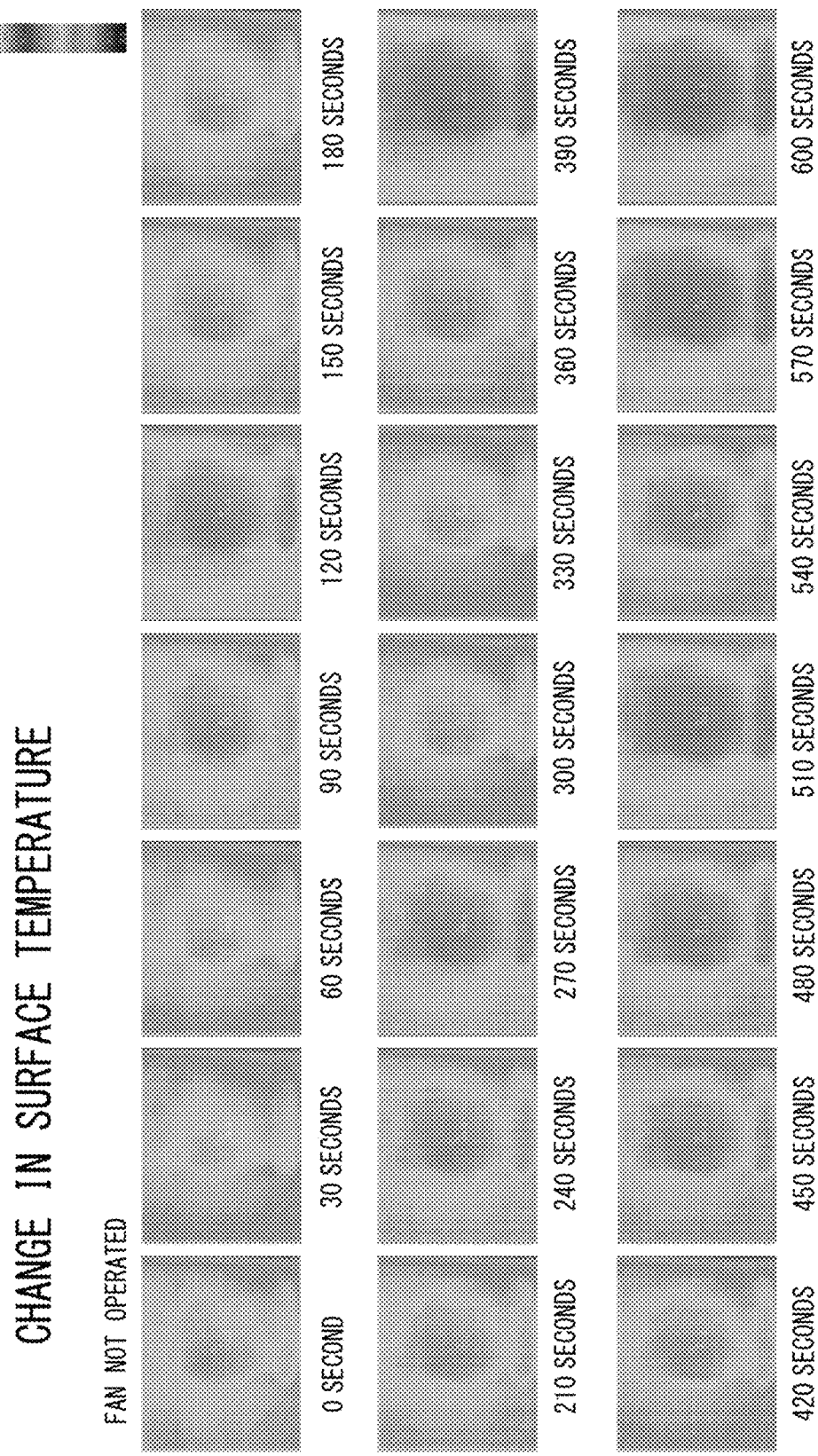
FIG. 16 is a chart illustrating a change in the surface temperature of the seat back which is measured under the non-operation of fans of the ventilation mechanism.

FIG. 16 is a chart illustrating how the surface temperature of the seat back 220 which is measured under the non-operation of the fans 11, 12 of the ventilation mechanism 1 changes during 600 seconds after the start of the experiment. There is no great change up to 600 seconds from the start of the experiment, but room temperature in the laboratory increases by about 0.3 to 0.5° C. after 600 seconds pass from the start of the experiment, and accordingly, the surface temperature of the seat cushion 210 also slightly rises with time.

FIG. 17 illustrates an experiment that is conducted while the fans 11, 12 of the ventilation mechanism 1 are operated. The fans 11, 12 are put into operation simultaneously with the start of the experiment, and owing to the influence of the heat of the motors of the fans 11, 12, the temperature near the center rises even at a 0-second instant, but after thirty seconds pass and after sixty seconds pass, the surface temperature drops quickly. Thereafter, the surface temperature rises and drops, but presents a slightly increasing tendency with time. This is thought to be due to the rise in the room temperature in the laboratory and the influence of the heat of the motors. However, as compared with the case in FIG. 16 in which the fans 11, 12 are not driven, it is obvious that the surface temperature is kept low.

Figure 18:
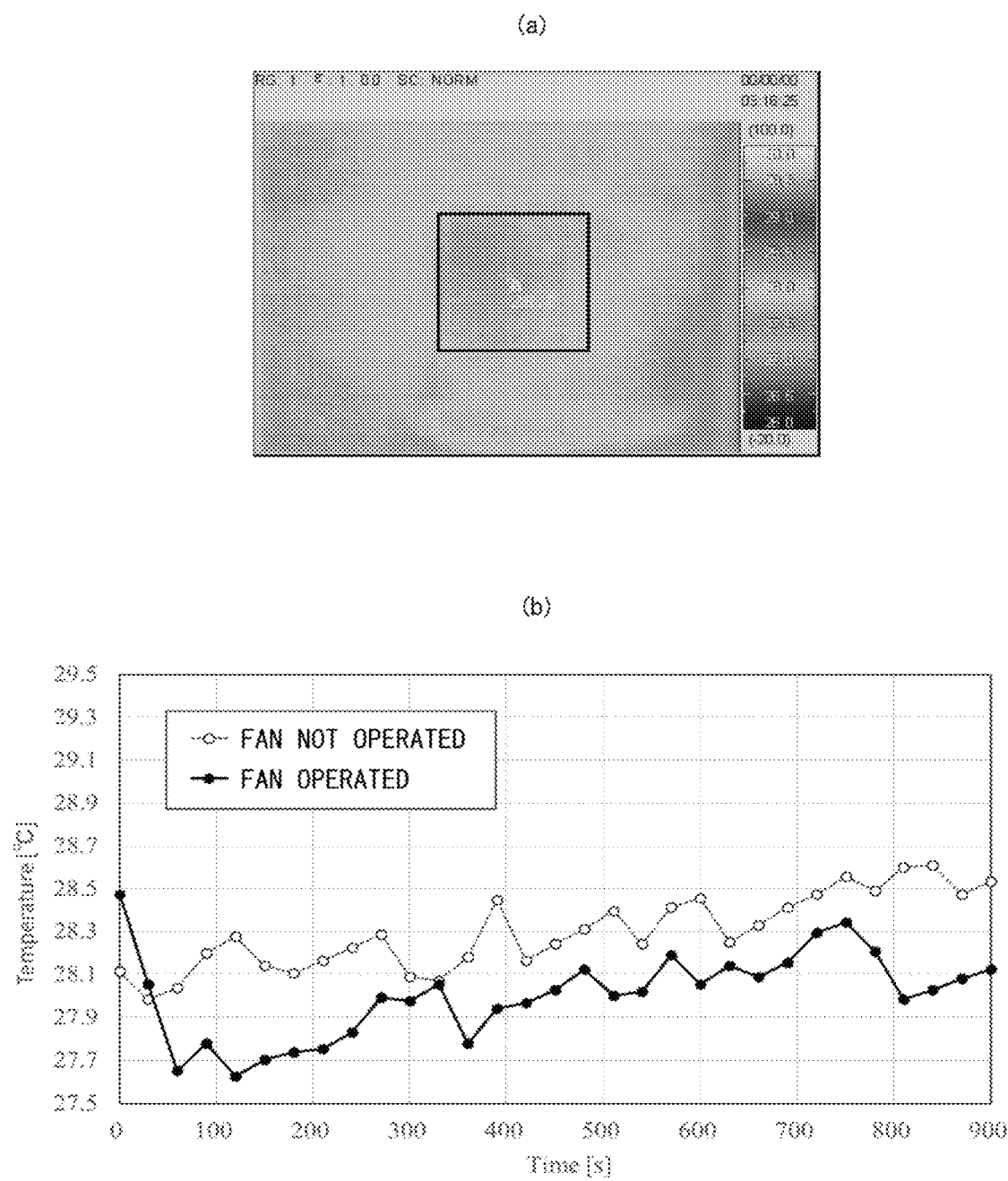
FIG. 18(a) is a chart illustrating a range in which the surface temperature graphed in FIG. 18(b) is measured.
FIG. 18(b) illustrates graphs of changes in the surface temperature.

FIG. 18(b) illustrates graphs of changes in the surface temperature of the center portion surrounded by the black frame in FIG. 18(a) in the seat back 220. As is seen from FIG. 18(b), in the case where the fans 11, 12 are operated, the surface temperature quickly drops at the start of the experiment, and the surface temperature is also kept lower thereafter as compared with the case where the fans 11, 12 are not operated. It is seen that the air stream and a negative pressure generated on the vehicle seat 200 side where the ventilation mechanism 1 of this embodiment is disposed act on the microclimate condition on the seat occupant side because, as the outer layer members adopted in the seat back 220 and the seat cushion 210, those not allowing the air to flow in the thickness direction are used as described above.

(Experiment of Linkage with Biological State Analysis Device 300)

Next, an experiment was conducted in which subjects were each seated on the vehicle seat 200 according to the embodiment illustrated in FIG. 14, and the ventilation mechanisms 1 were controlled while the biosignals were analyzed. The subjects were five healthy males and three healthy females in their twenties to sixties. Measurement devices used were an electrocardiograph (BSM-230 manufactured by NIHON KOHDEN CORPORATION), a continuous blood pressure monitor (manufactured by Finapres Medical Systems B.V.), a drowsy driving warning device (Sleep Buster (registered trademark)) manufactured by DELTATOOLING Co., Ltd.

Figure 19:
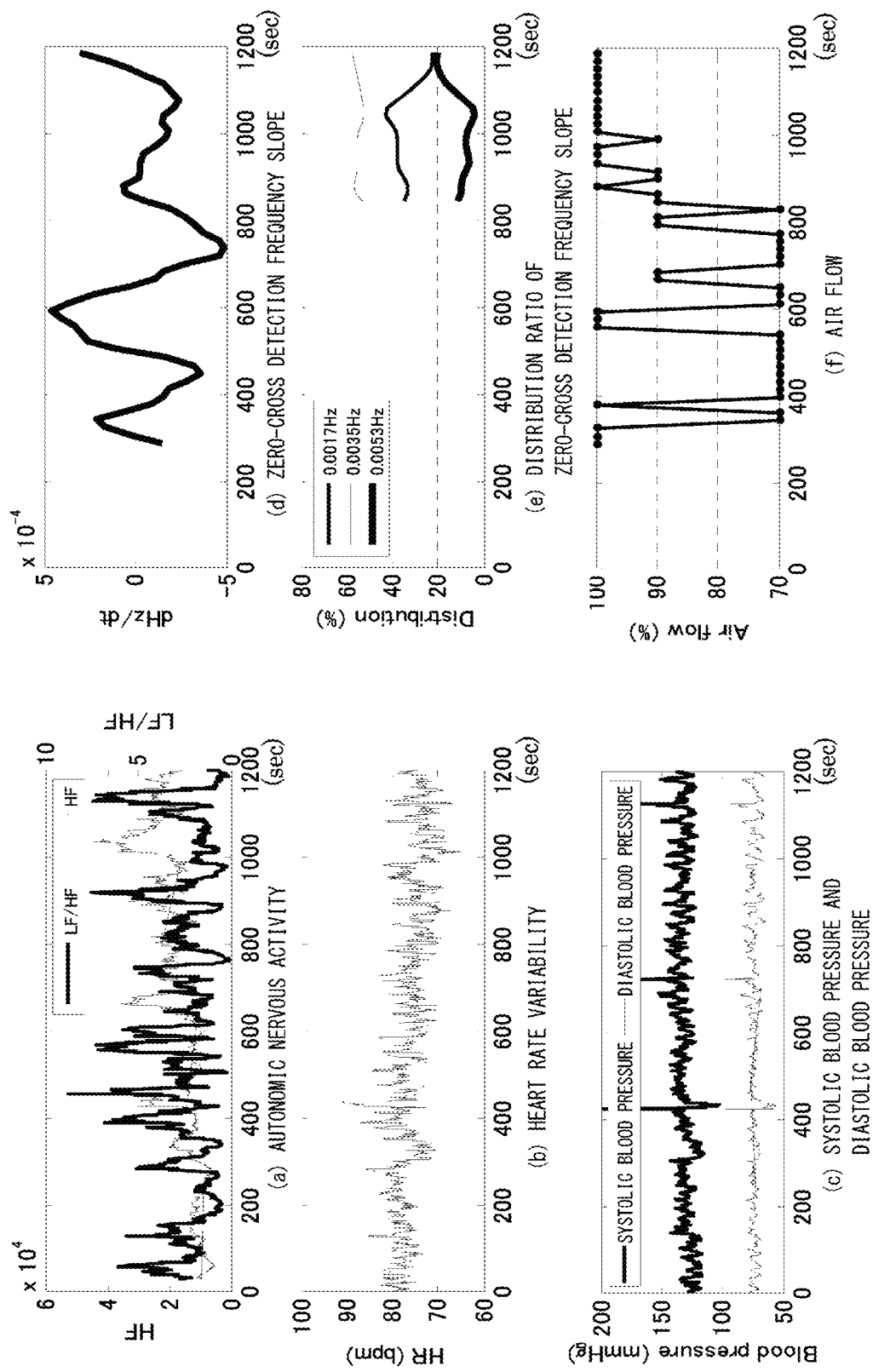
FIGS. 19(a) to (c) are charts illustrating examples of data of autonomic nervous activity, heart rate variability, and systolic blood pressure and diastolic blood pressure, FIGS. 19(d), (e) are charts illustrating examples of a frequency slope time-series waveform and a time-series waveform of a distribution ratio of the frequency slope which are obtained from the biological state analysis device.
FIG. 19(f) is a chart illustrating an example of an air flow rate level of an air stream discharged from the ventilation mechanism.

FIGS. 19(a) to (f) illustrate data of a male subject in his forties and illustrate part of the results of the control using the biological state analysis device 300. FIGS. 19(a) and (b) illustrate autonomic nervous activity and heart rate variability of the subject, which are analyzed using an R-R interval found from an electrocardiogram. FIG. 19(c) illustrates data of systolic blood pressure and diastolic blood pressure, which are obtained from the continuous blood pressure monitor. FIGS. 19(d), (e) illustrate a frequency slope time-series waveform, a time-series waveform of a frequency slope distribution ratio (see Japanese Patent Application Laid-open No. 2011-167362, WO2011/046178, Japanese Patent Application Laid-open No. 2014-117425, Japanese Patent Application Laid-open No. 2014-223271, and so on) which are obtained from the biological state analysis device 300 (Sleep Buster (registered trademark)). Out of these, FIG. 19(d) illustrates a time-series waveform of a frequency slope (zero-cross detection frequency slope) calculated from a zero-cross point of a time-series signal of the dorsal body surface pulse wave collected from the subject by the bio-signal measurement device 400, and illustrates a time-series waveform of fluctuation of a frequency component of the ventricular systole. The distribution ratio (distribution ratio of the zero-cross detection frequency slope) in FIG. 19(e) presents dominant frequency bands of 0.04 Hz or less, and one with a high distribution ratio is a frequency band where the dominant frequency is present. FIG. 19(f) illustrates a time-series change in the air flow rate level of the air stream discharged from the exhaust port 13 by the fans 11, 12 of the ventilation mechanism 1 which is linked with the output results of the biological state analysis device 300 (Sleep Buster (registered trademark)).

FIGS. 20(a) to (c) illustrate the frequency analysis results of the time-series waveforms in FIGS. 19(b) to (d). From the log-log representations of the heart rate variability, the systolic blood pressure, and the diastolic blood pressure, the fluctuations of the time-series waveforms are known. Further, from the analysis result of the frequency slope calculated from the zero-cross point, peak values of the slope are known.

First, from FIG. 19(a), during 300 seconds from the start of the experiment, the elevation of the sympathetic nerve activity was recognized and the state at this time was a stable awakening state. When 300 seconds passed, the elevation of the parasympathetic nerve activity was recognized, and the heart rate and the systolic blood pressure also changed, from which it is inferred that the state changed from the awakening state to a strong sleepy state. This can also be understood from the fact that, in a subsequent time zone after over 400 seconds passed, the strong elevation of the sympathetic nerve activity resisting the sleepiness was recognized, and the heart rate and the blood pressures also instantaneously rose. Thereafter, in a period from 400 to 800 seconds, the sympathetic nerve predominant state continued, the heart rate presented a decreasing tendency, and in contract, the systolic blood pressure presented a high tendency, which can be understood as phenomena occurring in a state with a high awakening degree. These phenomena are also known from an increase in the amplitude and a decrease in the frequency of the frequency slope time-series waveform using the zero-cross point. Further, a change in the air flow rate of the fans also follows well. The air flow rate of the fans becomes high when the sleepiness becomes strong, and at the time of the temporary awakening, the air flow rate of the fans also decreases accordingly. For the sudden elevation of the sympathetic nerve activity around 600 seconds, the frequency slope using the zero-cross point indicates a hypnagogic symptom phenomenon, the heart rate and the systolic blood pressure temporarily increase, and the air flow rate of the fans also temporarily increases.

Figure 20:
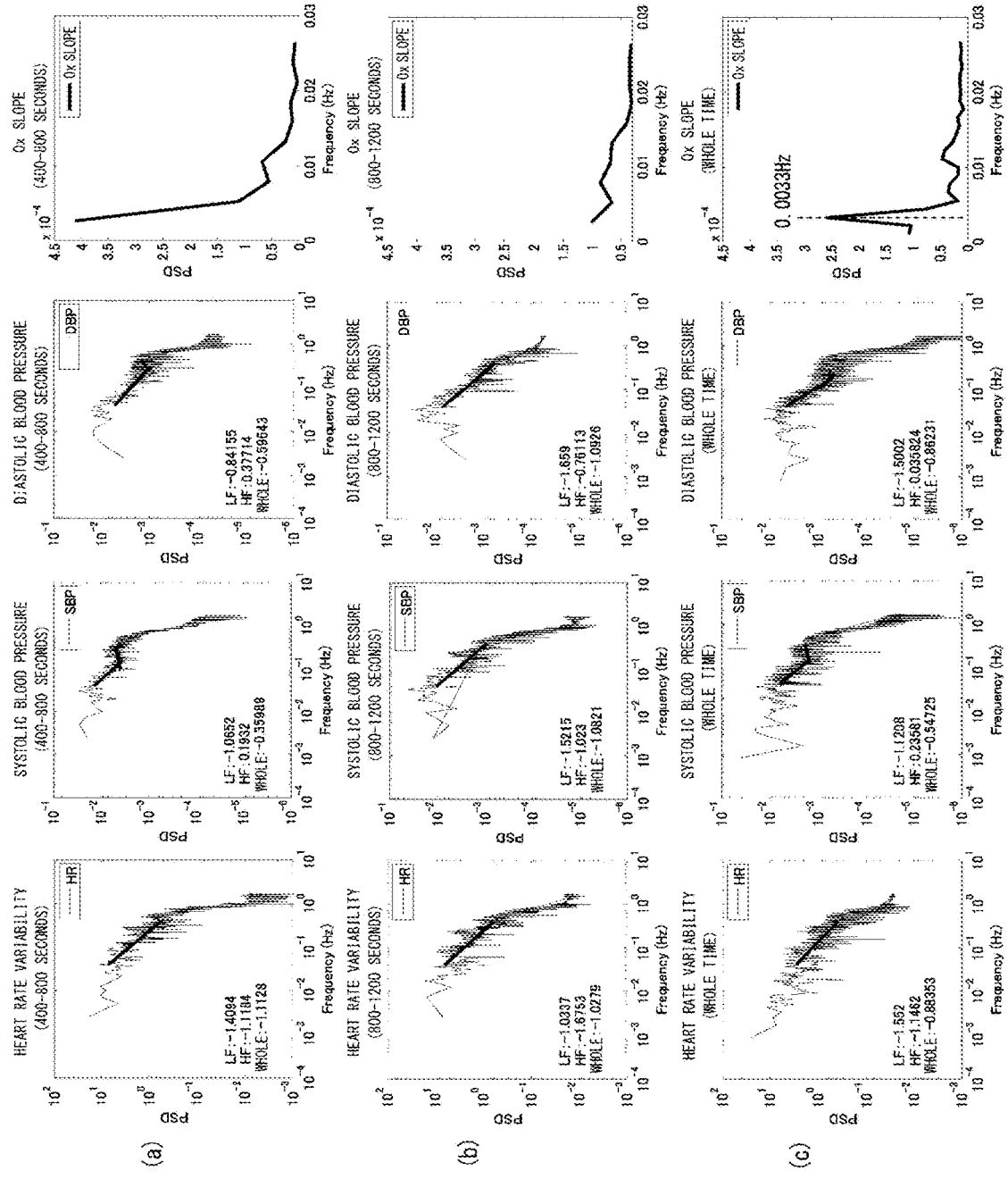
FIGS. 20(a) to (c) are charts illustrating frequency analysis results of the time-series waveforms in FIGS. 19(b) to (d).

On the other hand, the ways the biological signals in a resting and awakening state were linked were different. Around 900 seconds, the sudden elevation of the sympathetic nerve activity occurs, and the heart rate increases while the systolic blood pressure drops. This is a phenomenon appearing in the resting state, and the frequency time-series waveform calculated from the zero-cross point and its distribution ratio both indicate the stable state. This can be also understood from the fact that the heart rate variability and changes in the blood pressures in the same time zone in FIG. 20 present a 1/f fluctuation. These phenomena occur while the air flow rate of the fans is increasing, and it is thought that the fans cause the awakening, change the clothing microclimate, and change the cutaneous blood flow.

The third sudden elevation of the sympathetic nerve activity in the next 1100 to 1150 seconds is linked with a temporary increase in the systolic blood pressure. Even though the systolic blood pressure is on the increase, the heart rate is also on the increase. This indicates the second hypnagogic symptom phenomenon. In the same time zone, a 0.0017 Hz component and a 0.0053 Hz component in the distribution ratio of the frequency slope time-series waveform calculated from the zero-cross point present a sudden change at an around two-minute instant, and this index also indicates the hypnagogic symptom phenomenon. The expansion of the vascular system of the peripheral circulation system at this time causes an increase in the body temperature, and a change in the clothing microclimate is recognized. From this, it can be inferred that the increase in the air flow rate of the fans gives a more comfortable thermal environment. Specifically, in the same time zone, the 0.0035 Hz component shown in the frequency analysis of the frequency slope time-series waveform calculated from the zero-cross point presents a high peak value. This indicates a comfortable resting state, and it is thought that increasing the air flow rate of the fans for heat release due to thermogenesis from the body influenced the balance between heat input and heat release in the clothing, and accordingly the comfortable thermal environment was created. Incidentally, a subject's comment given after the experiment regarding the same time zone was, "I felt I would be able to sleep comfortably, or I would probably sleep."

According to this embodiment, as described above, when the biosignal analysis device 300 detects that the seat occupant is in a predetermined state, the signal corresponding to this state is sent to the drive control units 1a of the ventilation mechanisms 1, thereby automatically driving the fans 11, 12, so that the air is sucked from the intake ports 103a, 103b and is discharged from the exhaust ports 13 to form the air streams on the vehicle seat 200 sides, and the microclimate conditions on the seat occupant side are replaced with the microclimate conditions on the vehicle seat 200 sides created by these air streams, making it possible to enhance the comfort of the clothing microclimate of the seat occupant.

That is, the air stream control by the ventilation mechanisms 1 linked with the autonomic nervous function and the heart rate variability influences the balance between the heat input and the heat release in the clothing, so that the comfortable thermal environment can be created in the clothing. The comfortable thermal environment differs depending on each person, but by thus linking the ventilation mechanisms 1 with the analysis result of the biological state analysis device 300, it is possible to derive a comfortable thermal environment suitable for each person.

Figure 21:
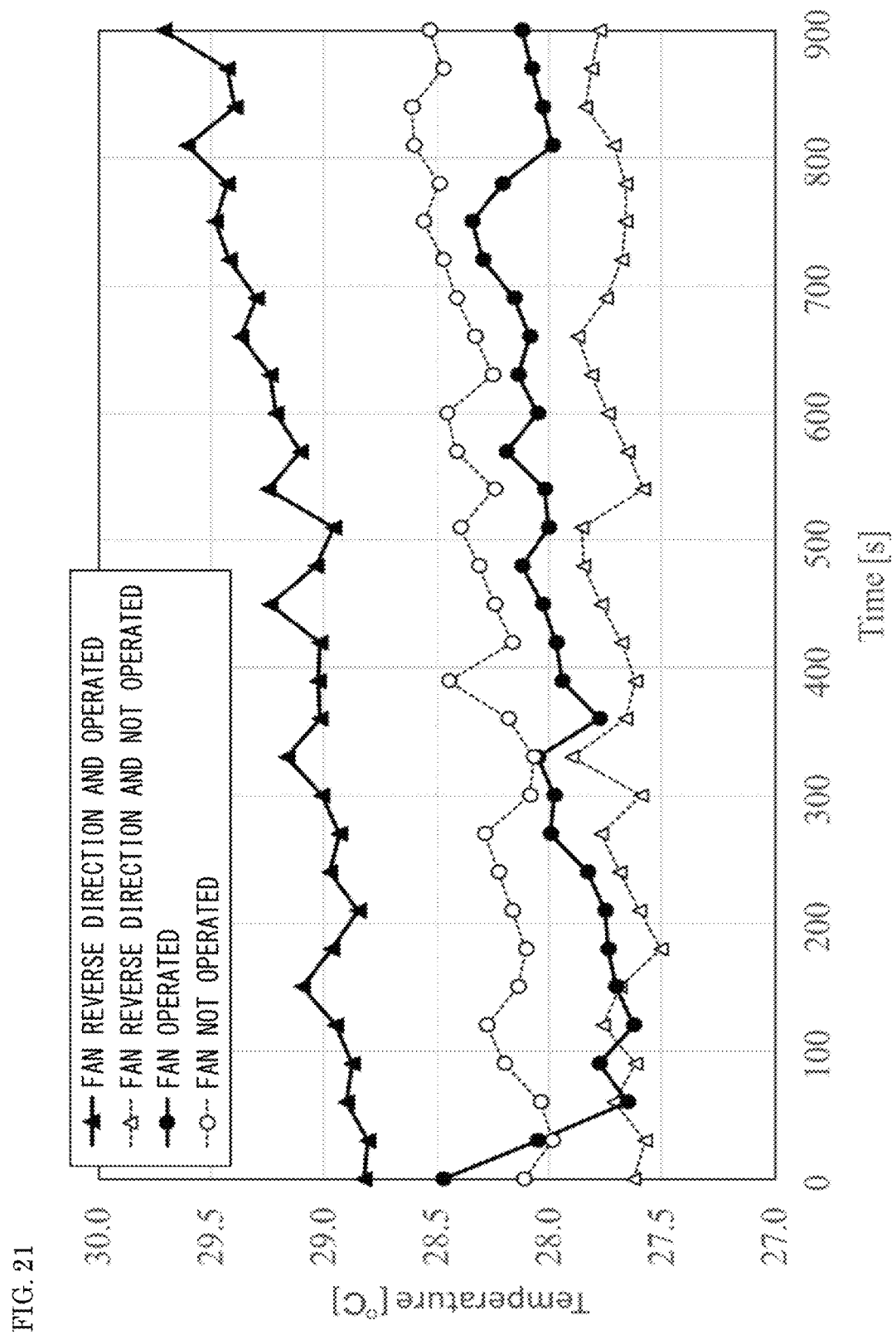
FIG. 21 is a chart illustrating the results of an experiment that measures a change in the surface temperature in a mode in which the fans of the ventilation mechanism disposed in the seat back are disposed on an upper side and its exhaust port is disposed on a lower side.

Here, a mode in which the ventilation mechanism 1 attached in the seat back is set in a reverse direction to that in the above-described embodiment will be described. Specifically, in the above-described example, the fans 11, 12 are disposed on the lower side and the exhaust port 13 is disposed on the upper side as illustrated in FIG. 14, but in this example, the fans 11, 12 are disposed on the upper side and the exhaust port 13 is disposed on the lower side. In this state, the same experiment as the experiment illustrated in FIG. 15 was conducted to measure the surface temperature of the seat back. FIG. 21 illustrates the results. Note that FIG. 21 also shows the data in FIG. 18(b).

From FIG. 21, in this mode, in the case of "FAN REVERSE DIRECTION AND NOT OPERATED", that is, in the case where the fans are not operated, the surface temperature is kept within a range of 27.5 degrees to 28 degrees, but in the case of "FAN REVERSE DIRECTION AND OPERATED", that is, in the case where the fans are operated, the surface temperature gradually increases from 28.5 degrees and after 900 seconds pass, increases up to nearly 30 degrees. This is because the fans are set closer to the back frame by being disposed on the reverse side, accordingly the heat of the motors of the fans acts on the back frame, the air stream of the fans diffuses the heat toward the vehicle seat, and this heat moves to the seat occupant side through the outer layer member. Therefore, by adjusting the arrangement direction of the fans, it is also possible for the ventilation mechanism of the present invention to warm the air stream on the vehicle seat side. Therefore, by making the direction of the ventilation mechanism manually or automatically adjustable, it is also possible to decrease or increase the temperature of the seat occupant-side environment with the single ventilation mechanism.

EXPLANATION OF REFERENCE SIGNS 1 ventilation mechanism
10 body case
101 bottom wall portion
102 peripheral wall portion
103 upper wall portion
104 guide wall
105 cylindrical portion
11, 12 fan
13 exhaust port
14 swirling stream generation part
200 vehicle seat
210 seat cushion
211 cushion frame
212 cushioning material
213 base net
214 pad material
215 cover member
220 seat back
221 back frame
222 cushioning material
223 base net
224 pad material
225 cover member
300 biological state analysis device
400 biosignal measurement device

The invention claimed is:

1. A vehicle seat ventilation mechanism comprising:
a body case which is provided in at least one of a seat cushion and a seat back of the vehicle seat on a rear surface side of a contact surface with a seat occupant and whose interior is an air circulation space;
an intake port and an exhaust port formed in the body case;
a fan which is disposed in the body case and sucks air from the intake port and causes the air to flow out from the exhaust port, thereby generating an air stream on the vehicle seat side which is the rear surface side of the contact surface; and
a swirling stream generation part which swirls the air stream in the body case to cause the air stream to be discharged as a swirling stream from the exhaust port, wherein a microclimate condition formed on the vehicle seat side by the air stream acts on the seat occupant side beyond the contact surface.

2. The vehicle seat ventilation mechanism according to claim 1, wherein the swirling stream generation part has a cylindrical portion rising in a direction toward the exhaust port and generates the swirling stream by making the air stream swirl around the cylindrical portion.

3. The vehicle seat ventilation mechanism according to claim 1, wherein the body case has a bottom wall portion and an upper wall portion which face each other at a predetermined interval and a peripheral wall portion surrounding peripheral edges of the bottom wall portion and the upper wall portion, and the intake port is provided in the upper wall portion at a position corresponding to the fan.

4. The vehicle seat ventilation mechanism according to claim 3, wherein, in the body case, a distance from the intake port to the bottom wall portion is set so as to enable part of the stream of the air sucked by the fan to be reflected by the bottom wall portion and discharged from the intake port.

5. The vehicle seat ventilation mechanism according to claim 1, wherein, in a case where the ventilation mechanism is provided in the seat cushion, a rotation center of the fan is located clear of a range with a predetermined body pressure distribution or higher including a position corresponding to an ischial tuberosity of the seat occupant and is located in a range more rearward or more forward than the range including the position corresponding to the ischial tuberosity.

6. The vehicle seat ventilation mechanism according to claim 1, wherein, in a case where the ventilation mechanism is provided in the seat back, a rotation center of the fan is located clear of a range with a predetermined body pressure distribution or higher including a position corresponding to an upper part of a pelvis of the seat occupant and is located in a range below or above the range including the position corresponding to the upper part of the pelvis.

7. The vehicle seat ventilation mechanism according to claim 1, wherein driving of the fan is controlled based on a biological state which is found through an analysis of a biosignal obtained from the seat occupant.

8. A vehicle seat comprising:
the vehicle seat ventilation mechanism according to claim 1, the ventilation mechanism being provided in at least one of a seat cushion and a seat back.

9. The vehicle seat according to claim 8, wherein a cushioning material forming the at least one of the seat cushion and the seat back includes a pad material and a cover member covering a surface of the pad material, and the vehicle seat ventilation mechanism is disposed in a concave portion formed in the pad material.

10. The vehicle seat according to claim 9, wherein an elastic member is provided on a bottom portion of the concave portion, and the vehicle seat ventilation mechanism is supported by the elastic member.

11. The vehicle seat according to claim 9, wherein the cover member is at least partly formed of a three-dimensional knitted fabric.

12. The vehicle seat according to claim 8, wherein, in the seat cushion, a rotation center of the fan of the ventilation mechanism is located clear of a range with a predetermined body pressure distribution or higher including a position corresponding to an ischial tuberosity of a seat occupant and is located in a range more rearward or more forward than the range including the position corresponding to the ischial tuberosity.

13. The vehicle seat according to claim 8, wherein, in the seat back, a rotation center of the fan of the ventilation mechanism is located clear of a range with a predetermined body pressure distribution or higher including a position corresponding to an upper part of a pelvis of a seat occupant and is located in a range below or above the range including the position corresponding to the upper part of the pelvis.

14. The vehicle seat according to claim 8,
wherein a biosignal measurement device which obtains a biosignal from the seat occupant is provided in the seat back, and
wherein driving of the fan of the ventilation mechanism is controlled based on a biological state which is found through an analysis of the biosignal.

15. The vehicle seat according to claim 14, wherein the ventilation mechanism has a drive control unit which controls the fan to vary an air flow rate level of the air stream based on the biological state.

\* \* \* \* \*